United States Patent
Pham et al.

(10) Patent No.: US 11,583,126 B2
(45) Date of Patent: *Feb. 21, 2023

(54) EXTERNAL MOTOR DRIVE SYSTEM FOR WINDOW COVERING SYSTEM WITH CONTINUOUS CORD LOOP

(71) Applicant: RYSE INC., Toronto (CA)

(72) Inventors: Trung Duc Pham, Brampton (CA); Alan Wing Hor Cheng, Mississauga (CA); Marc Rashad Bishara, Toronto (CA); Clifton Pereira, Toronto (CA)

(73) Assignee: RYSE INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,465

(22) Filed: Mar. 14, 2022

(65) Prior Publication Data
US 2022/0202227 A1 Jun. 30, 2022

Related U.S. Application Data

(60) Continuation of application No. 17/121,244, filed on Dec. 14, 2020, now Pat. No. 11,272,802, which is a
(Continued)

(51) Int. Cl.
*A47H 5/032* (2006.01)
*E06B 9/322* (2006.01)
(Continued)

(52) U.S. Cl.
CPC ............. *A47H 5/0325* (2013.01); *E06B 9/24* (2013.01); *E06B 9/322* (2013.01); *E06B 9/326* (2013.01);
(Continued)

(58) Field of Classification Search
CPC ......... A47H 5/0325; E06B 9/24; E06B 9/322; E06B 9/326; E06B 9/70; E06B 9/74;
(Continued)

(56) References Cited

U.S. PATENT DOCUMENTS 2,788,481 A 4/1957 Lui et al.
2,798,194 A 7/1957 Cantin
(Continued)

FOREIGN PATENT DOCUMENTS

CA 398637 A 8/1941
CA 926345 A 5/1973
(Continued)

OTHER PUBLICATIONS

"AXIS Gear—Calibration Demo"—Video published on May 31, 2016, with video playback webpage of YouTube, LLC, at https://www.youtube.com/watch?v=GYgtDjH1t_w.
(Continued)

*Primary Examiner* — Zoheb S Imtiaz
(74) *Attorney, Agent, or Firm* — Foley & Lardner LLP

(57) ABSTRACT

A motor driven system for raising and lowering a window covering executes motor ramp trajectory speed control. The motor ramp trajectory limits acceleration of an external motor from the idle (stationary) state to full operating speed, and limits deceleration of the motor from full operating speed back to the idle state. This function reduces stresses on a continuous cord loop drive mechanism. A control system manages solar heating effects in response to sunlight entrance conditions such as system sensor outputs, external weather forecasts, and other data sources. The system automatically opens or close the window covering to increase or decrease admitted sunlight under appropriate conditions. The input interface of the control system includes a visual display and input axis, which are aligned vertically if the window covering mechanism raises and lowers the window covering, and are aligned horizontally if the window covering mechanism laterally opens and closes the window covering.

20 Claims, 22 Drawing Sheets

Related U.S. Application Data division of application No. 16/255,647, filed on Jan. 23, 2019, now Pat. No. 10,863,846, which is a continuation-in-part of application No. 16/161,877, filed on Oct. 16, 2018, now Pat. No. 11,178,992, which is a continuation of application No. 15/282,686, filed on Sep. 30, 2016, now Pat. No. 10,104,997.

(60) Provisional application No. 62/236,826, filed on Oct. 2, 2015.

(51) Int. Cl.

| | | |
|---|---|---|
| *E06B 9/24* | (2006.01) | |
| *H02P 1/16* | (2006.01) | |
| *E06B 9/74* | (2006.01) | |
| *E06B 9/70* | (2006.01) | |
| *E06B 9/36* | (2006.01) | |
| *E06B 9/326* | (2006.01) | |
| *E06B 9/68* | (2006.01) | |
| *F16H 19/06* | (2006.01) | |
| *E06B 9/262* | (2006.01) | |

(52) U.S. Cl.
CPC ............ *E06B 9/368* (2013.01); *E06B 9/70* (2013.01); *E06B 9/74* (2013.01); *H02P 1/16* (2013.01); *E06B 2009/2622* (2013.01); *E06B 2009/6809* (2013.01); *E06B 2009/6818* (2013.01); *E06B 2009/6827* (2013.01); *E06B 2009/6845* (2013.01); *F16H 19/06* (2013.01); *F16H 2019/0681* (2013.01)

(58) Field of Classification Search
CPC ............ E06B 9/78; E06B 2009/6818; E06B 2009/6827; E06B 2009/6845; E06B 2009/785; H02P 1/16; F16H 19/06; F16H 2019/0681

See application file for complete search history.

(56) References Cited

U.S. PATENT DOCUMENTS

| | | | |
|---|---|---|---|
| 3,096,078 A | 7/1963 | Steingass et al. | |
| 3,117,767 A | 1/1964 | McLean et al. | |
| 3,269,454 A | 8/1966 | Gill et al. | |
| 3,561,520 A | 2/1971 | Gill | |
| 3,658,230 A | 4/1972 | Enock | |
| 4,031,944 A | 6/1977 | Morrison et al. | |
| 4,131,831 A | 12/1978 | Bochenek et al. | |
| 4,610,294 A | 9/1986 | Anesi et al. | |
| 4,618,804 A * | 10/1986 | Iwasaki ............ G07C 9/00182 | |
| | | | 318/16 |
| 4,775,039 A | 10/1988 | Sunakawa | |
| 4,819,708 A | 4/1989 | Onosato et al. | |
| 4,856,574 A | 8/1989 | Minami et al. | |
| 4,896,713 A | 1/1990 | Rademacher | |
| 4,902,953 A | 2/1990 | Kraft et al. | |
| 4,914,360 A | 4/1990 | Hsieh et al. | |
| 4,956,588 A | 9/1990 | Ming | |
| 4,958,112 A | 9/1990 | Zerillo | |
| 5,033,527 A | 7/1991 | Ouvrard et al. | |
| 5,170,108 A | 12/1992 | Peterson et al. | |
| 5,270,629 A | 12/1993 | Hsieh | |
| 5,362,222 A * | 11/1994 | Faig ............... B29C 45/80 | |
| | | | 425/149 |
| 5,414,334 A | 5/1995 | Cheron | |
| 5,465,980 A | 11/1995 | Maurin | |
| 5,532,560 A | 7/1996 | Element et al. | |
| 5,540,269 A | 7/1996 | Plumer | |
| 5,547,008 A | 8/1996 | Sullivan | |
| 5,793,174 A | 8/1998 | Kovach et al. | |
| 5,847,525 A | 12/1998 | Cheron et al. | |
| 5,959,430 A | 9/1999 | Yuki et al. | |
| 6,076,592 A | 6/2000 | Grutzner | |
| 6,283,190 B1 | 9/2001 | Hu et al. | |
| 6,446,693 B1 | 9/2002 | Anderson et al. | |
| 6,465,980 B1 | 10/2002 | Orsat | |
| 6,516,858 B1 | 2/2003 | Anderson et al. | |
| 6,598,652 B1 | 7/2003 | Montesinos Alonso | |
| 6,827,121 B2 | 12/2004 | Park | |
| 6,850,017 B1 | 2/2005 | Domel et al. | |
| 6,935,403 B2 | 8/2005 | Killo et al. | |
| 7,337,825 B1 | 3/2008 | Erbe | |
| 7,360,576 B2 | 4/2008 | Lin | |
| 7,389,806 B2 | 6/2008 | Kates | |
| 7,466,090 B2 | 12/2008 | Meewis et al. | |
| 7,599,612 B2 | 10/2009 | Moseley et al. | |
| 7,919,939 B2 | 4/2011 | Mosbrucker | |
| 8,033,374 B2 | 10/2011 | Gunton | |
| 8,044,626 B2 | 10/2011 | Adamus et al. | |
| 8,368,328 B2 | 2/2013 | Mullet et al. | |
| 8,498,747 B2 | 7/2013 | Feldstein | |
| 8,587,242 B2 | 11/2013 | Berman et al. | |
| 8,939,190 B2 | 1/2015 | Mullet et al. | |
| 9,072,398 B2 | 7/2015 | Choo et al. | |
| 9,080,382 B2 | 7/2015 | Lagarde et al. | |
| 9,534,442 B2 | 1/2017 | Derk et al. | |
| 9,670,723 B2 | 6/2017 | Pham et al. | |
| 9,879,475 B2 | 1/2018 | Mullet et al. | |
| 10,104,997 B2 | 10/2018 | Pham et al. | |
| 10,494,863 B2 | 12/2019 | Pham et al. | |
| 10,626,668 B2 | 4/2020 | Hall et al. | |
| 10,863,846 B2 * | 12/2020 | Pham ................ E06B 9/74 | |
| 11,178,992 B2 * | 11/2021 | Pham ................ H02P 1/16 | |
| 2001/0050538 A1 * | 12/2001 | Kovach ............. E06B 9/32 | |
| | | | 318/16 |
| 2003/0168185 A1 | 9/2003 | Wen et al. | |
| 2003/0168187 A1 | 9/2003 | Wen et al. | |
| 2004/0026049 A1 | 2/2004 | Park | |
| 2006/0162877 A1 | 7/2006 | Chou | |
| 2007/0056697 A1 | 3/2007 | Chen | |
| 2008/0236763 A1 | 10/2008 | Kates | |
| 2009/0251831 A1 * | 10/2009 | Shiba ............... H02P 27/06 | |
| | | | 361/30 |
| 2012/0053731 A1 | 3/2012 | Feldstein et al. | |
| 2012/0090797 A1 * | 4/2012 | Mullet ............. E06B 9/322 | |
| | | | 160/331 |
| 2012/0193035 A1 | 8/2012 | Malekpour | |
| 2012/0261078 A1 * | 10/2012 | Adams .............. E06B 9/68 | |
| | | | 160/331 |
| 2012/0261079 A1 | 10/2012 | Chambers et al. | |
| 2013/0135333 A1 * | 5/2013 | Chen ............... H05B 47/19 | |
| | | | 345/589 |
| 2013/0146436 A1 | 6/2013 | Ticoalu et al. | |
| 2013/0180676 A1 | 7/2013 | Berman et al. | |
| 2014/0008028 A1 | 1/2014 | Rastegar | |
| 2014/0138033 A1 | 5/2014 | Lagarde et al. | |
| 2014/0224437 A1 * | 8/2014 | Colson .............. E06B 9/72 | |
| | | | 160/311 |
| 2014/0359976 A1 | 12/2014 | Lu et al. | |
| 2015/0074584 A1 | 3/2015 | Sasaki et al. | |
| 2015/0288316 A1 | 10/2015 | Hall et al. | |
| 2015/0330144 A1 | 11/2015 | Jung et al. | |
| 2015/0349402 A1 * | 12/2015 | Camden ............. H04W 4/80 | |
| | | | 343/702 |
| 2015/0376943 A1 | 12/2015 | Slupik et al. | |
| 2016/0032647 A1 | 2/2016 | Adreon et al. | |
| 2016/0130874 A1 | 5/2016 | Pham et al. | |
| 2017/0095103 A1 | 4/2017 | Pham et al. | |
| 2017/0257927 A1 * | 9/2017 | Camden ............. H01Q 13/10 | |
| 2017/0260806 A1 * | 9/2017 | Adams ............. H04W 52/0245 | |
| 2018/0106105 A1 | 4/2018 | Anthony et al. | |
| 2018/0202224 A1 | 7/2018 | Kumar | |
| 2019/0150651 A1 * | 5/2019 | Pham ................ E06B 9/368 | |
| 2020/0080371 A1 | 3/2020 | Pham et al. | |

FOREIGN PATENT DOCUMENTS

| | | |
|---|---|---|
| CA | 1283471 C | 4/1991 |
| CA | 2162443 A1 | 5/1996 |
| CA | 2385368 A1 | 9/2003 |

(56) References Cited

FOREIGN PATENT DOCUMENTS

| | | | |
|---|---|---|---|
| CA | 2532092 A1 | 7/2007 | |
| CA | 2804238 A1 | 1/2012 | |
| CA | 2766358 A1 | 7/2012 | |
| CA | 2870983 | 5/2016 | |
| CA | 2966999 | 5/2016 | |
| CN | 2279130 Y | 4/1998 | |
| CN | 2330773 Y | 7/1999 | |
| CN | 2390001 Y | 8/2000 | |
| CN | 201332933 Y | 10/2009 | |
| CN | 203220229 U | 10/2013 | |
| CN | 203271549 U | 11/2013 | |
| CN | 108463605 | 8/2018 | |
| DE | 89 03 355 U1 | 6/1989 | |
| DE | 19837267 A1 | 2/2000 | |
| EP | 1 700 996 A2 | 9/2006 | |
| EP | 2 682 560 A2 | 1/2014 | |
| EP | 2 743 442 A1 | 6/2014 | |
| EP | 3 215 702 A1 | 9/2017 | |
| GB | 0 236 275 A | 7/1925 | |
| GB | 2 362 675 A | 11/2001 | |
| GB | 2 362 675 B | 12/2003 | |
| WO | WO-2014/165367 A1 | 10/2014 | |
| WO | WO-2016/070279 | 5/2016 | |
| WO | WO-2017/054083 A1 | 4/2017 | |
| WO | WO-2018/037118 A1 | 3/2018 | |

OTHER PUBLICATIONS

"AXIS Gear—Installation Demo"—Video published on May 3, 2016, with video playback webpage of YouTube, LLC, at https://www.youtube.com/watch7v--Huzzb1mAB9l.

"AXIS Gear—Motorize Your Window Shades & Curtains"—Video published on Nov. 7, 2015,with video playback webpage of YouTube, LLC, https:://www.youtube.com/watch?v=5PgSFI94pDE.

"AXIS Gear—The Timeless Art of Seduction"—Video published on Nov. 9, 2015, with video playback webpage of YouTube,LLC, at http://www.youtube.com/watch?v==zgZBNhEQaYM.

"Axis Gear raising window shades"—Video published on Dec. 29, 2015, with video playback webpage of YouTube, LLC, at https://www.youtube.com/watch?v=LUB0xSB2Evw.

"AXIS Gear—Motorize your window shades"—Video published on Jun. 28, 2016, with video playback web page of YouTube, LLC, at https://www.youtube.com/watch?v==E12YGTvcbCw. iw1~?,v. ,cmtuhe.corniwatcl(\= E12Y GTvchCw.

"CEDIA 2016: AXIS Launches AXIS Gear at CEDIA 2016"—Video published on Sep. 15, 2016, with video playback webpage of YouTube, LLC, at https://www.youtube.com/watch?v==9PLOkA1tfvc.

"Controlling the AXIS Gear"—Video published on Oct. 27, 2015, with video playback webpage of YouTube, LLC, at https://www.youtube.com/watch?y=e2 WSkKYx~zM.

"Installing AXIS Gear"—Video published on Oct. 27, 2015, with video playback webpage of YouTube, LLC, at https://www. youtube.com/watch?v==u61BD16e720.

"Lifestyle Video AXIS Gear 2MIN"—Video published on Apr. 7, 2016, with video playback webpage of YouTube, LLC, at https://www.youtube.com/watch?v==NvJxe3tzrPc.

"Motorize your window shades with AXIS Gear"—Video published on Oct. 26, 2015, with video playback webpage of YouTube, LLC, at https://www.youtube.com/watch?v==dJgA8LcjnnU.

"Wake Up to Sunshine with AXIS Gear"—Video published on Nov. 3, 2015, with video playback webpage of YouTube, LLC, at https://www.youtube.com/watch?v=RE2hMiJdvnQ.

"Driven Pulley", ScienceDirect Topics, retrieved Feb. 12, 2021 from URL: https://www.sciencedirect.com/topics/engineering/driven-pulley, 2021 (37 pages).

Bortnowski et al., "Tests of Belt Linear Speed for Identification of Frictional Contact Phenomena", Sensors, vol. 20, 2020 (13 pages).

Canadian Office Action issued in CA Appl. Ser. No. 2,966,999, dated Feb. 20, 2019 (5 pages).

Chinese Decision of Rejection issued in CN Appl. Ser. No. 201580065177.2, dated Apr. 24, 2020 (7 pages).

Chinese Office Action issued in CN Appl. Ser. No. 2015/80065177.2, dated Aug. 24, 2018 (12 pages).

Chinese Office Action issued in CN Appl. Ser. No. 2015/80065177.2, dated Jun. 5, 2019 (9 pages).

Chinese Office Action issued in CN Appl. Ser. No. 2015/80065177.2, dated Sep. 10, 2019 (16 pages).

Chinese Office Action issued in CN Appl. Ser. No. 2016800706680, dated Mar. 7, 2019 (10 pages).

Chinese Office Action issued in CN Appl. Ser. No. 201911099117.9 dated Apr. 2, 2021 (11 pages).

Examination Report for CA 3066140 dated Nov. 16, 2021 (3 pages).

Extended European Search Report dated Jul. 2, 2019, issued in corresponding European Application No. 16849985.3, 8 pages.

Extended European Search Report, dated Aug. 13, 2018, issued in corresponding European Patent Application No. EP 15 85 6630, 10 pages.

Foreign Action other than Search Report on CA 3066140 dated Apr. 29, 2022 (3 pages).

Hwangbo et al., "Cable-Driven Actuation for Highly Dynamic Robotic Systems", IEEE/RSJ International Conference on Intelligent Robots and Systems (IROS), Jun. 27, 2018, arXiv:1806.10632v1 (9 pages).

International Preliminary Report on Patentability, Ch. I, for PCT/CA2019/050715 dated Aug. 5, 2021 (7 pages).

International Search Report and the Written Opinion of the International Searching Authority dated Sep. 17, 2019 in corresponding International Application No. PCT/CA2019/050715, 12 pages.

International Search Report and Written Opinion in PCT Appl. Ser. No. PCT/CA2015/051140, dated Jan. 11, 2016 (8 pages).

International Search Report and Written Opinion on PCT Appl. Ser. No. PCT/CA2022/050285 dated May 16, 2022 (11 pages).

International Search Report issued in PCT Appl. Ser. No. PCT/CA2016/051138, dated Jan. 17, 2017 (6 pages).

Jin et al., "Geometric Parameter Calibration for a Cable-Driven Parallel Robot Based on a Single One-Dimensional Laser Distance Sensor Measurement and Experimental Modeling", Sensors, vol. 18, No. 7, Jul. 2018, pp. 2392 (27 pages).

Karanth et. al., "An Experimental Technique to Measure Creep in Conveyor Belt Drives", Bulk Solids Handling, vol. 14, Nov. 4, 1994, retrieved Feb. 12, 2021 from URL: https://www.ckit.co.za/secure/conveyor/papers/bulk-solids-handling/experimentaltech1.htm (7 pages).

Lutron Intelligent Hembar AlignmentTM; Technical White Paper; May 2010; 8 pages.

Non-Final Office Action for U.S. Appl. No. 16/681,037 dated Dec. 7, 2021 (14 pages).

Non-Final Office Action in U.S. Appl. No. 14/934,642 dated Sep. 15, 2016, 8 pages.

Non-Final Office Action issued in U.S. Appl. No. 15/282,686 dated Feb. 1, 2018 (15 pages).

Non-Final Office Action on U.S. Appl. No. 16/161,877 dated Jan. 1, 2021 (12 pages).

Non-Final Office Action on U.S. Appl. No. 16/255,647 dated Mar. 6, 2020 (11 pages).

Notice of Allowance for U.S. Appl. No. 16/161,877 dated Oct. 21, 2021 (7 pages).

Notice of Allowance for U.S. Appl. No. 17/121,244 dated Nov. 4, 2021 (8 pages).

Notice of Allowance issued on U.S. Appl. No. 16/161,877 dated Jun. 10, 2021 (10 pages).

Notice of Allowance on U.S. Appl. No. 15/282,686 dated Jun. 20, 2018. 11 pages.

Notice of Allowance on U.S. Appl. No. 16/255,647 dated Aug. 24, 2020 (13 pages).

Notice of Allowance on U.S. Appl. No. 16/255,647 dated Jul. 1, 2020 (13 pages).

Notice of Allowance on U.S. Appl. No. 16/681,037 dated Jun. 6, 2022 (8 pages).

Notification of Reexamination for CN 201580065177.2 dated Sep. 13, 2021 (9 pages).

(56) References Cited

OTHER PUBLICATIONS

Piao et al., "Open-loop position control of a polymer cable-driven parallel robot via a viscoelastic cable model for high payload workspaces", Advances in Mechanical Engineering, vol. 9, No. 12, 2017, DOI: 10.1177/1687814017737199 (12 pages).
Reexamination Decision for CN 201580065177.2 dated Jan. 29, 2022 (40 pages).
Second Office Action for CN 201911099117.9 dated Aug. 31, 2021 (7 pages).

* cited by examiner

EXTERNAL MOTOR DRIVE SYSTEM FOR WINDOW COVERING SYSTEM WITH CONTINUOUS CORD LOOP

CROSS-REFERENCE TO RELATED APPLICATIONS

The present application is a continuation of U.S. Ser. No. 17/121,244, entitled "EXTERNAL MOTOR DRIVE SYSTEM FOR WINDOW COVERING SYSTEM WITH CONTINUOUS CORD LOOP," filed Dec. 14, 2020, which is a divisional of U.S. Ser. No. 16/255,647, entitled "EXTERNAL MOTOR DRIVE SYSTEM FOR WINDOW COVERING SYSTEM WITH CONTINUOUS CORD LOOP," filed Jan. 23, 2019, which is a continuation-in-part of U.S. Ser. No. 16/161,877, entitled "EXTERNAL MOTOR DRIVE SYSTEM FOR WINDOW COVERING SYSTEM WITH CONTINUOUS CORD LOOP," filed Oct. 16, 2018, which is a continuation of U.S. Ser. No. 15/282,686 filed Sep. 30, 2016, entitled "EXTERNAL MOTOR DRIVE SYSTEM FOR WINDOW COVERING SYSTEM WITH CONTINUOUS CORD LOOP," which claims benefit of U.S. Provisional Application No. 62/236,826 filed Oct. 2, 2015, entitled "ON-DEVICE MULTI-CONTROL OF EXTERNALLY MOUNTED DEVICE TO MOTORIZE WINDOW COVERINGS," all of which are hereby incorporated by reference in their entirety.

TECHNICAL FIELD

The present disclosure relates to a system for spreading and retracting window coverings that use continuous cord loops, and more particularly to an external motor drive device for a system for spreading and retracting window coverings.

BACKGROUND

Window covering systems for spreading and retracting coverings for architectural openings such as windows, archways and the like are commonplace. Systems for spreading and retracting such window coverings may operate for example by raising and lowering the coverings, or by laterally opening and closing the coverings. (Herein the terms spreading and retracting, opening and closing, and raising and lowering window coverings are all used, depending on context). Such window covering systems typically include a headrail or cassette, in which the working components for the covering are primarily confined. In some versions, the window covering system includes a bottom rail extending parallel to the headrail, and some form of shade material which might be fabric or shade or blind material, interconnecting the headrail and bottom rail. The shade or blind material is movable with the bottom rail between spread and retracted positions relative to the headrail. For example, as the bottom rail is lowered or raised relative to the headrail, the fabric or other material is spread away from the headrail or retracted toward the headrail so it can be accumulated either adjacent to or within the headrail. Such mechanisms can include various control devices, such as pull cords that hang from one or both ends of the headrail. The pull cord may hang linearly, or in the type of window covering systems addressed by the present invention, the pull cord may assume the form of a closed loop of flexible material such as a rope, cord, or beaded chain, herein referred to as a continuous cord loop, or alternatively as chain/cords.

In some instances, window covering systems have incorporated a motor that actuates the mechanism for spreading and retracting the blind or shade material, and controlling electronics. Most commonly, the motor and controlling electronics has been mounted within the headrail of the window blinds, or inside the tubes (sometimes called tubular motors), avoiding the need for pull cords such as a continuous cord loop. Using such motor-operated systems or devices, the shade or blind material can be spread or retracted by user actuation or by automated operation e.g., triggered by a switch or photocell. Such window covering systems in which the motor and controlling electronics has been mounted within the headrail are sometimes herein called an "internal motor," "internal motor device," or "internal motor system."

The drive system of the present invention incorporates a motor and controlling electronics mounted externally to the mechanism for spreading and retracting the blind or shade material. Such drive system is herein called an "external motor," "external motor device," or "external motor system," and alternatively is sometimes called an "external actuator." External motor systems are typically mounted externally on the window frame or wall and engage the cords or chains (continuous cord loop) of window coverings in order to automate opening and closing the blind.

In both internal motor systems and external motor systems (herein sometimes called collectively, motorized systems), automated drive systems incorporate controlling electronics to control operation. Commonly, motorized systems have been controlled through user control mechanisms that incorporate an RF (radio frequency) controller or other remote controller for wireless communication with a drive system associated with the motor. Such remote user control systems have taken various forms such as a handheld remote control device, a wall-mounted controller/switch, a smart-home hub, a building automation system, and a smart phone, among others. The use of such remote control devices is particularly germane to internal motor systems in which it is difficult or impossible to integrate user control devices within the internally mounted drive system.

In the external motor drive system of the present disclosure, since the external actuator is separated from the headrail or other window coverings mechanism, this opens up new possibilities for integrating user controls in the external actuator itself. These integrated control features are herein sometimes called "on-device control." On-device control of external motor systems offers various advantages, such as simplicity of operation, and convenience in accessing the control device and in executing control functions. Such on-device control of external motor systems can be integrated with automated control systems through appropriate sensors, distributed intelligence, and network communications.

Automated control over window covering systems can provide various useful control functions. Examples of such automated window control functions include calibrating the opening and closing of blinds to meet the preferences of users, and controlling multiple blinds in a coordinated or centralized fashion. There effectively is a need to integrate various automated window control functions in on-device control for external actuators.

SUMMARY

The embodiments described herein include a motor drive system for operating a mechanism for spreading and retracting window coverings. The motor drive system includes a motor operating under electrical power and a drive assembly. The motor drive system advances a continuous cord loop in response to positional commands from a controller. An input-output device for the controller includes an input interface that receives user inputs along an input axis, and a visual display aligned with the input axis of the input interface. In an embodiment, the input-output device includes a capacitive touch strip that receives user inputs along an input axis, and an LED strip aligned with the input axis.

In an embodiment, the input-output device extends vertically on the exterior of a housing for the motor drive system, and the housing supports input buttons. In an embodiment, buttons on the housing include a group mode module and a set control module. In another embodiment, the housing supports an RF communication button.

In an embodiment, a group mode module communicates the positional commands to other motor drive systems within an identified group to operate respective of other mechanisms of the other motor drive systems. In an embodiment, the group mode module causes an RF communication module to communicate the positional commands to other motor drive systems. In an embodiment, the other motor drive systems within the identified group operate the respective other mechanisms in accordance with a calibration of a respective top position and a respective bottom position for each of the other motor drive systems.

In an embodiment, a set control module enables user calibration of a top position and a bottom position of travel of the window covering. In an embodiment, during calibration the user moves the window covering respectively to the top position and the bottom position with the input interface, and presses a set button to set these positions.

In an embodiment, the drive assembly comprises a driven wheel configured for engaging and advancing the continuous cord loop coupled to the mechanism for raising and lowering the window covering, and an electrically powered coupling mechanism coupling the driven wheel to the output shaft of the motor and configured for rotating the driven wheel in first and second senses. Rotation of the driven wheel in a first sense advances the continuous cord loop in the first direction, and rotation of the driven wheel in a second sense advances the continuous cord loop in the second direction. The controller provides the positional commands to the motor and the electrically powered coupling mechanism to control the rotation of the driven wheel in the first and second senses.

In an embodiment, in addition to providing positional commands to the motor and the drive assembly, and other control commands, via external motor device on-device controls, such commands may be provided by input-output (I/O) devices separate from the external motor device on-device control, such as mobile user devices. In an embodiment, the control system includes a web application that can emulate various one-axis input and one-axis display features of external motor on-device controls.

In an embodiment, the external motor device is configured to raise or lower the window covering, such as in roller shades and Roman shades, via vertical position control. In an embodiment, the external motor device is configured to open or close the window covering laterally (e.g., across the window frame), such as in vertical blinds or curtains, via horizontal position control. In an embodiment, the control system includes a graphical user interface configured to display an input control that extends either vertically or horizontally, depending on the type of window covering system that is driven by the external motor.

In an embodiment, a motor drive system comprises a motor configured to operate under electrical power to rotate an output shaft of the motor, wherein the motor is external to a mechanism for raising and lowering a window covering; and a drive assembly configured for engaging and advancing a continuous cord loop coupled to the mechanism for raising and lowering the window covering. Advancing the continuous cord loop in a first direction raises the window covering, and advancing the continuous cord loop in a second direction lowers the window covering. The motor drive system includes a controller for providing positional commands to the motor and the drive assembly to control advancing the continuous cord loop in the first direction and advancing the continuous cord loop in the second direction. An input-output device for the controller includes an input interface that receives user inputs along an input axis to cause the controller to provide the positional commands to the motor and the drive assembly, and a visual display aligned with the input axis of the input interface.

In various embodiments, the external motor drive executes a speed control procedure during transition of the motor from an idle state to full operating speed, and during transition of the motor from full operating speed back to the idle state. The motor drive system includes a controller that provides positional signals, and a motor controller for powering the motor. The controller and motor controller are configured to execute a motor ramp trajectory speed control that limits acceleration of the motor from the idle state to full operating speed, and that limits deceleration of the motor from full operating speed back to the idle state. Ramp trajectory control of motor speed is observed to reduce or avoid stresses on the continuous cord loop drive system that can stretch, weaken, or otherwise damage the continuous cord loop such as a rope, cord, or beaded chain.

In an embodiment, the control system for external motor drive of window coverings includes a subsystem for managing solar heating effects. In various embodiments, this control subsystem coordinates with system sensors such as a light sensor and temperature sensor, external data sources, and other data sources to regulate window covering position control based on a plurality of sunlight entrance conditions. Sunlight entrance conditions include, e.g., light and temperature sensor outputs, weather conditions, time-of-day, location of the window coverings, and other parameters that can affect solar heat gain. In an embodiment, in the event the control system determines that a plurality of sunlight entrance conditions received by the controller corresponds to one or more window cover criteria, the controller causes the drive assembly to spread the window covering. In the event the control system determines that a plurality of sunlight entrance conditions received by the controller corresponds to one or more window uncover criteria, the controller causes the drive assembly to retract the window covering.

In an embodiment, a drive system for use with a window covering system including a headrail, a mechanism associated with the headrail for spreading and retracting a window covering, and a continuous cord loop extending below the headrail for actuating the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a controller for providing positional commands to the motor and the drive assembly to control the advancing the continuous cord loop in the first direction and the advancing the continuous cord loop in the second direction; and an input-output device for the controller, including an input interface that receives user inputs along an input axis to cause the controller to provide the positional commands to the motor and the drive assembly, and further including a visual display aligned with the input axis of the input interface; wherein the drive assembly and the controller operate in one of a vertical mode and a horizontal mode; wherein in the vertical mode the drive assembly is configured for advancing the continuous cord loop in the first direction to lower the window covering and is configured for advancing the continuous cord loop in the second direction to raise the window covering, and the visual display and the input axis of the input interface are aligned vertically; and wherein in the horizontal mode the drive assembly is configured for advancing the continuous cord loop in the first direction to laterally close the window covering and is configured for advancing the continuous cord loop in the second direction to laterally open the window covering, and the visual display and the input axis of the input interface are aligned horizontally.

In another embodiment, a drive system for use with a window covering system including a mechanism for spreading and retracting a window covering, and a continuous cord loop extending below the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a temperature sensor communicatively coupled to the controller for providing positional commands to the motor and the drive assembly, wherein the temperature sensor is configured to provide a temperature output representative of a temperature in the vicinity of the drive system; a light sensor communicatively coupled to the controller for providing positional commands to the motor and the drive assembly, wherein the light sensor is configured to provide a light output representative of intensity of ambient light in the vicinity of the drive system; a controller for providing positional commands to the motor and the drive assembly to control the advancing the continuous cord loop in the first direction and the advancing the continuous cord loop in the second direction; wherein the controller receives a plurality of sunlight entrance conditions including the temperature output and the light output, wherein in the event the plurality of sunlight entrance conditions received by the controller corresponds to one or more window cover criteria, the controller causes the drive assembly to advance the continuous cord loop in the first direction to spread the window covering, and in the event the plurality of sunlight entrance conditions received by the controller corresponds to one or more window uncover criteria, the controller causes the drive assembly to advance the continuous cord loop in the second direction to retract the window covering.

In another embodiment, a method for controlling a motor-driven device comprises receiving, by a processor via a graphical user interface of a computing device, a request for selecting a window covering mechanism from at least one vertical window covering mechanisms configured for raising and lowering a window covering via a motor-driven device and at least one horizontal window covering mechanisms configured for laterally opening and closing the window covering via the motor-driven device; displaying, by the processor via the graphical user interface of the computing device, a graphical representation of the at least one vertical window covering mechanisms and the at least one horizontal window covering mechanisms, and receiving a selection of one of the at least one vertical window covering mechanisms and the at least one horizontal window covering mechanisms; in response to the receiving the selection of the one of the one of the at least one vertical window covering mechanisms and the at least one horizontal window covering mechanisms, if the selected window covering mechanism is one of the at least one vertical window covering mechanisms, displaying via the graphical user interface a position control visual display with an input axis, wherein the input axis is aligned vertically; if the selected window covering mechanism is one of the at least one horizontal window covering mechanisms, displaying via the graphical user interface a position control visual display with an input axis, wherein the input axis is aligned horizontally; and in response to receiving a position control input via the position control visual display with the input axis, outputting to the motor-driven device, by the processor, a position control command based on the position control input.

In a further embodiment, a motor drive system, comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing the continuous cord loop in the first direction and the advancing the continuous cord loop in the second direction; wherein the drive assembly comprises an electrically powered coupling mechanism coupling the drive assembly to the output shaft of the motor and configured for rotating the driven wheel in first and second senses, and a motor controller for powering the electrically powered coupling mechanism; wherein the controller and motor controller are configured to execute a motor ramp trajectory speed control that limits acceleration of the motor from an idle state to full operating speed, and limits deceleration of the motor from full operating speed back to the idle state.

In an embodiment, a drive system for use with a window covering system including a headrail, a mechanism associated with the headrail for spreading and retracting a window covering, and a continuous cord loop extending below the headrail for actuating the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a controller configured to provide positional commands to the motor and the drive assembly to control the advancing the continuous cord loop in the first direction and the advancing the continuous cord loop in the second direction; and an input-output device for the controller including a graphical user interface configured to receive user inputs to cause the controller to control the positional commands to the motor and the drive assembly at a selected speed of the advancing the continuous cord loop in a selected one of the first direction or the second direction, wherein in a first speed control mode the input-output device causes the controller to control the speed of the advancing the continuous cord loop at a selected percentage within a range of speeds from stationary to a maximum speed, and in a second speed control mode the input output device causes the controller to control the speed of the advancing the continuous cord loop at a selected one of a limited number of predetermined speed levels.

In an embodiment, a motor drive system comprises a first motor configured to operate under electrical power to rotate an output shaft of the motor, wherein the first motor is external to a first mechanism for raising and lowering a window covering; a drive system configured for engaging and advancing a continuous cord loop coupled to the first mechanism for raising and lowering the window covering, wherein advancing the continuous cord loop in a first direction raises the window covering, and advancing the continuous cord loop in a second direction lowers the window covering; a controller for providing positional commands to the first motor and the first electrically powered drive system to control the advancing of the continuous cord loop in the first direction and the advancing of the continuous cord loop in the second direction; an RF communication module operatively coupled to the controller for controlling RF communication of the positional commands to a network of other motor drive systems for operating respective other mechanisms for raising and lowering respective other window coverings; and a group mode module, for identifying one or more of the other motor drive systems included in a user-selected group, and for causing the RF communication module to communicate the positional commands to the identified one or more of the other motor drive.

In an embodiment, a motor drive system comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing of the continuous cord loop in the first direction and the advancing of the continuous cord loop in the second direction to control the raising and lowering the window covering; and a set control module for user calibration of a top position and a bottom position of the window covering, wherein following the user calibration the controller limits the raising and lowering the window covering between the top position and the bottom position.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
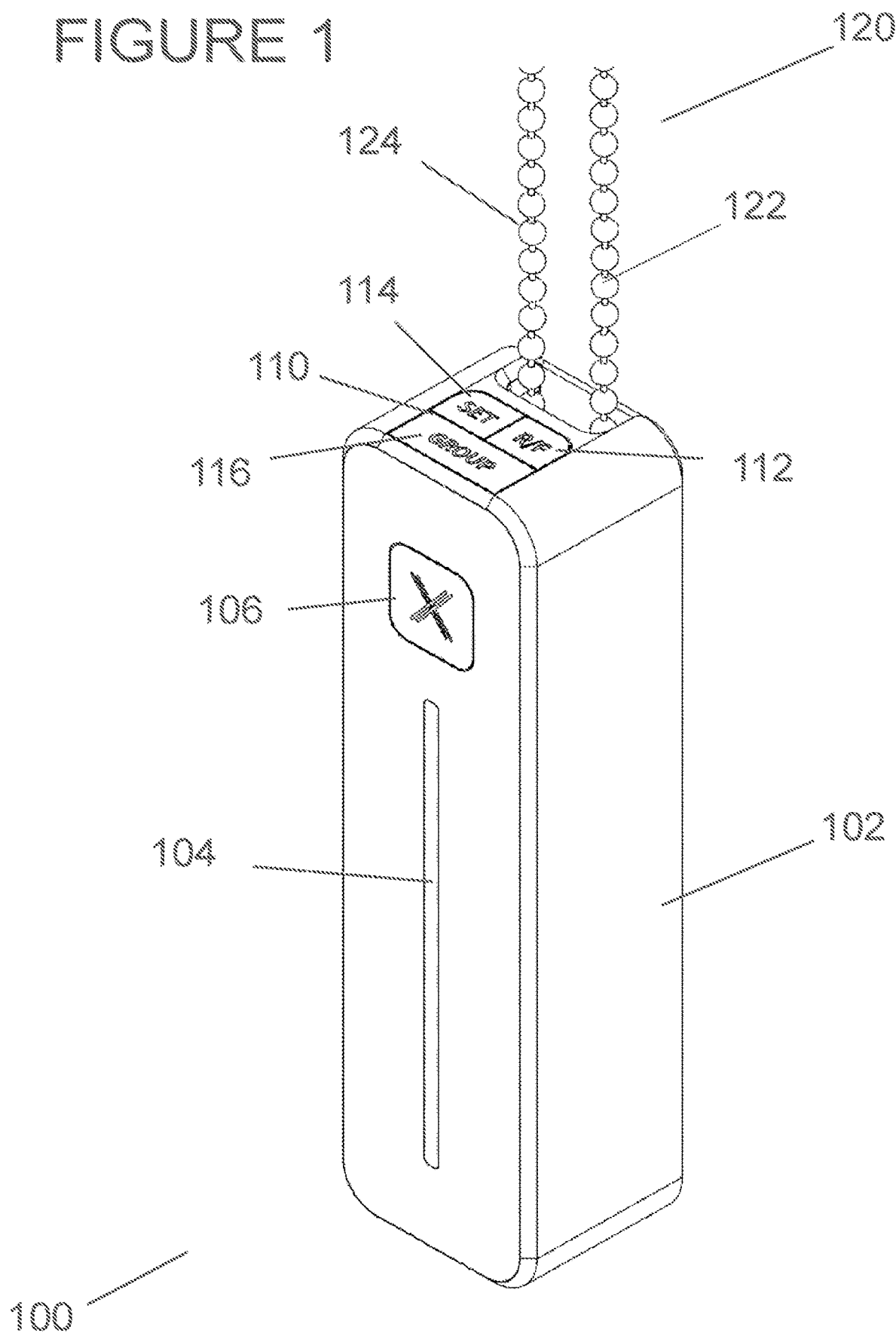
FIG. 1 is an isometric view of an external motor device.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one, skilled in the relevant art and having possession of this disclosure, are to be considered within the scope of the invention.

The present disclosure describes various embodiments of an external motor device for controlling the operation of a window covering system. In various embodiments, the external motor device employs on-device control, employs a separate control device (e.g., a mobile computing device), or both. As used in the present disclosure, a "window covering system" is a system for spreading and retracting or raising and lowering a window covering. In an embodiment as shown at 200 in FIG. 5, the window covering system includes a headrail 202, and a mechanism (not shown) associated with the headrail (i.e., a mechanism within the headrail or adjacent the headrail) for spreading and retracting a window covering. In this embodiment, the window covering system 200 includes a continuous cord loop 220 extending below the headrail for actuating the mechanism associated with the headrail, to spread and retract the window covering. As used in the present disclosure, "headrail" is a broad term for a structure of a window covering system including a mechanism for spreading and retracting the window covering. The window covering system further includes an external motor 210. Continuous cord loop 220 operatively couples the window covering mechanism associated with headrail 202 to the external motor 210 to raise and lower a window shade (fabric, or blind) 204. As seen in FIG. 6, external motor 210 is mounted to the wall 206 adjacent to the window, which is covered by shade 204 in this view. For example, external actuator may be mounted to wall 206 using hardware such as bolts 214, or using a mounting fixture such as bracket 194 in FIG. 2.

In the present disclosure, "window covering" includes any covering material that may be spread and retracted to cover a window or other architectural opening using a continuous cord loop system (i.e., system with a mechanism for spreading and retracting the window covering using a continuous cord loop). Such window coverings include most shades and blinds as well as other covering materials, such as: roller shades; honeycomb shades; horizontal sheer shades, pleated shades, woven wood shades, Roman shades, Venetian blinds, Pirouette® shades (Pirouette is a trademark of Hunter Douglas N.V., Rotterdam, Germany), and certain systems for opening and closing curtains and drapery. Window covering embodiments described herein refer to blind or blinds, it being understood that these embodiments are illustrative of other forms of window coverings.

As used in the present disclosure, a "continuous cord loop" is an endless loop of flexible material, such as a rope, cord, beaded chain and ball chain. Continuous cord loops in the form of loops of cord are available in various types and ranges of diameter including for example D-30 (1⅛"-1¼"), C-30 (1³⁄₁₆"-1⁷⁄₁₆"), D-40 (1³⁄₁₆"-1⁷⁄₁₆"), and K-35 (1¼"-1½"). Additionally, various types of beaded chain and ball chain are commonly used as continuous cord loops for window covering systems. A typical ball chain diameter is 5 mm (0.2 inch). In a common window covering system design, the continuous cord loop includes a first loop end at the headrail engaging a mechanism associated with the headrail for spreading and retracting the window covering, and includes a second loop end remote from the headrail. Continuous cord loops come in different cord loop lengths, i.e., the length between the first loop end and the second loop end, sometimes rounded off to the nearest foot. In one embodiment, e.g., in a roller blinds system, the continuous cord loop extends between the headrail and the second loop end, but does not extend across the headrail. In this embodiment, the first loop end may wrap around a clutch that is part of the mechanism spreading and retracting the blind. In another embodiment, e.g., in a vertical blinds system, a segment of the continuous cord loop extends across the headrail. In an embodiment, the continuous cord loop extends below the headrail in a substantially vertical orientation. When retrofitting the present external motor device to control a previously installed window coverings system, the continuous cord loop may be part of the previously installed window coverings mechanism. Alternatively, the user can retrofit a continuous cord loop to a previously installed window coverings mechanism.

The continuous cord loop system may spread and retract the window covering by raising and lowering, laterally opening and closing, or other movements that spread the window covering to cover the architectural opening and that retract the window covering to uncover the architectural opening. Embodiments described herein generally refer to raising and lowering blinds either under control of an external motor system or manually, it being understood that these embodiments are illustrative of other motions for spreading and retracting window coverings. External actuator 210 incorporates a motor drive system and controlling electronics for automated movement of the continuous cord loop 220 in one of two directions to raise or lower the blind 204. In one embodiment of window covering system 200, the continuous cord loop 220 includes a rear cord/chain 224 and a front cord/chain 222. In this embodiment, pulling down the front cord raises (retracts) the blind, and pulling down the rear cord lowers (spreads) the blind. As used in the present disclosure, to "advance" the continuous cord loop means to move the continuous cord loop in either direction (e.g., to pull down a front cord of a continuous cord loop or to pull down a back cord of a continuous cord loop). In an embodiment, the blind automatically stops and locks in position when the continuous cord loop is released. In an embodiment, when at the bottom of the blind, the rear cord of the continuous cord loop can be used to open any vanes in the blind, while the front cord can be used to close these vanes.

Figure 5:
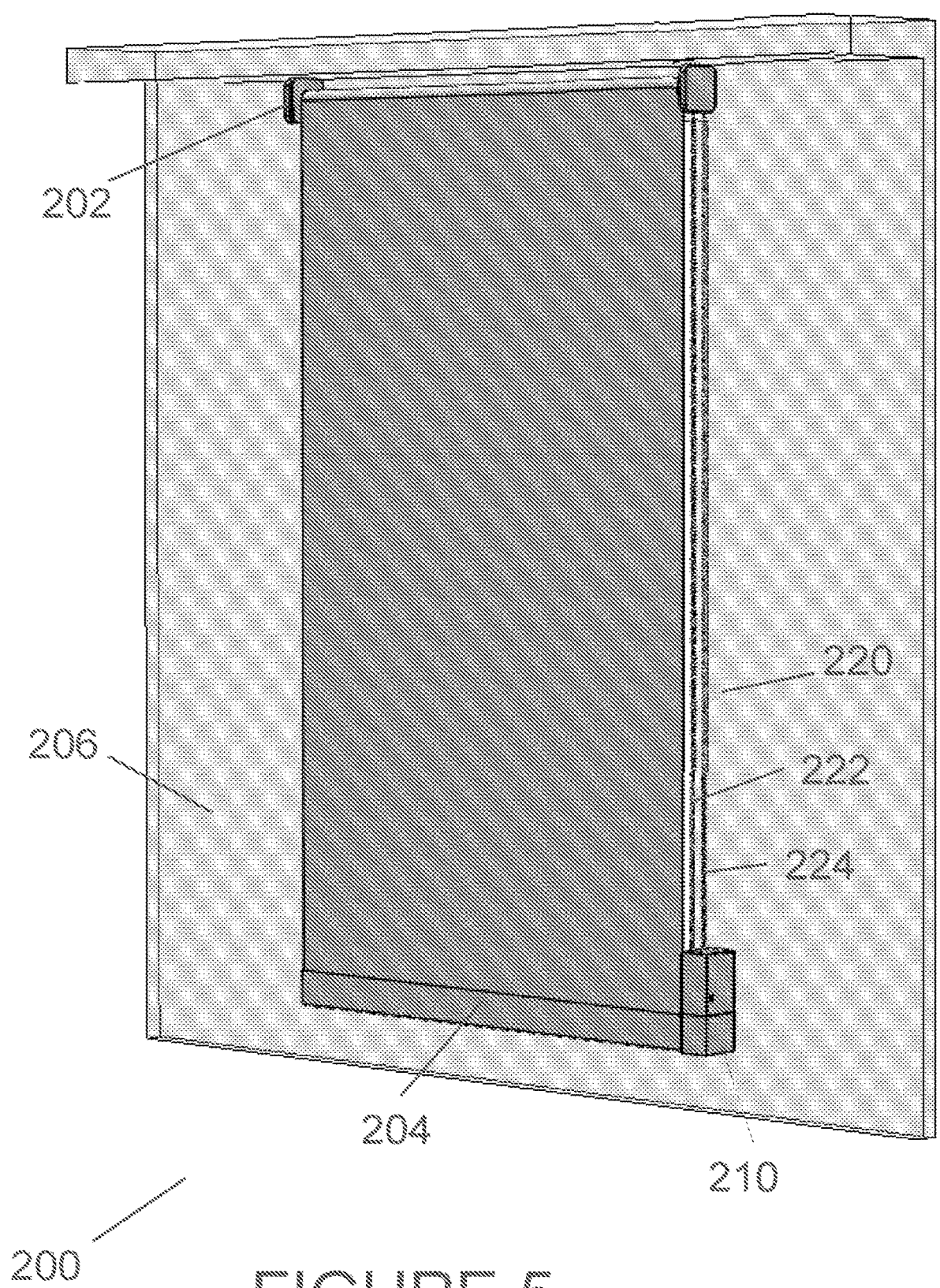
FIG. 5 is a perspective view of a window covering system with an external motor system installed on a flat wall, according to an embodiment.
Figure 6:
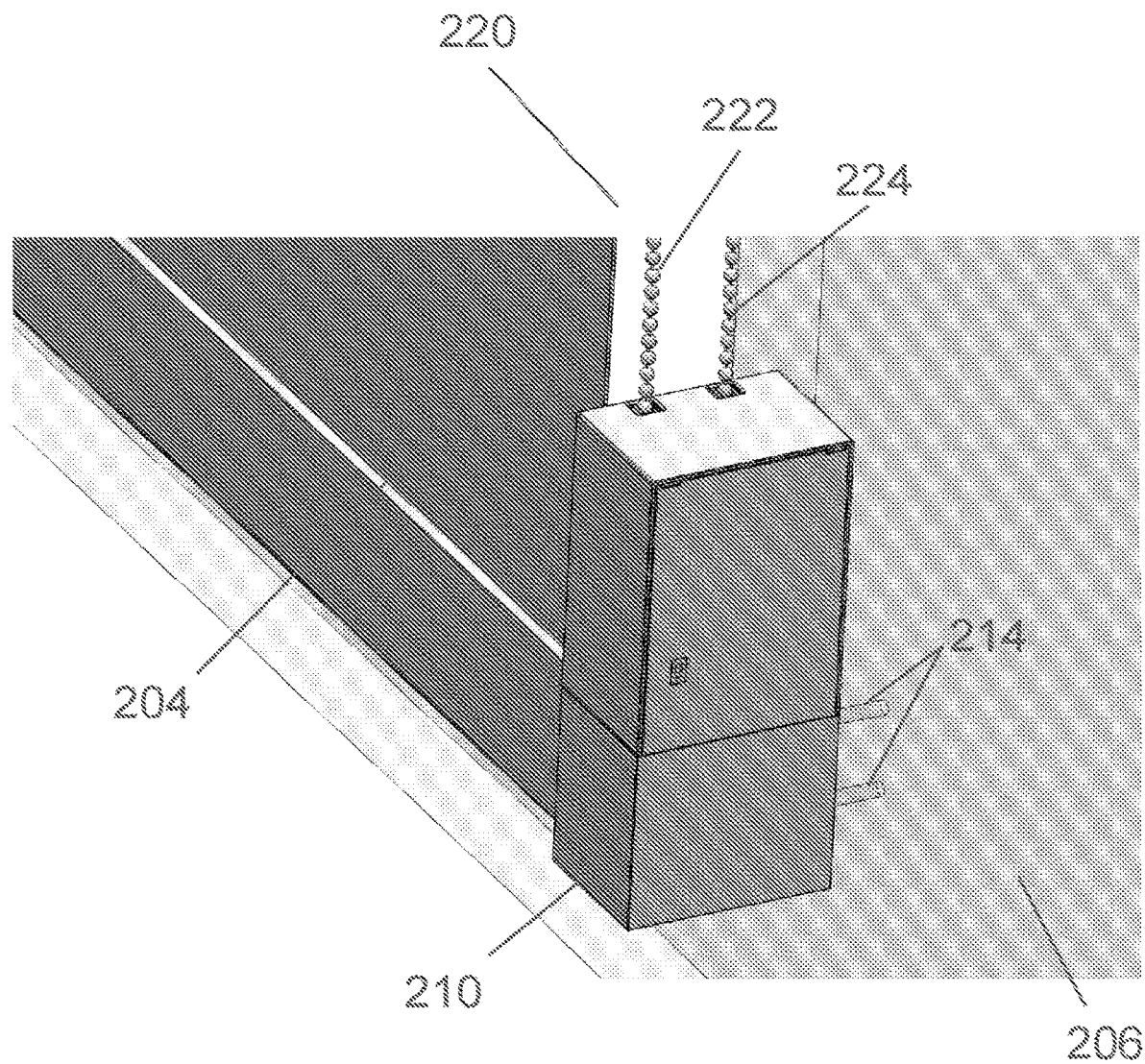
FIG. 6 is a perspective view of an installed external motor system for a window covering system, according to the embodiment of FIG. 5.

As seen in the isometric view of FIG. 1, an external motor 100 generally corresponding to the external motor 210 of FIGS. 5, 6 may include a housing 102 that houses a motor, associated drive mechanisms, and control electronics. External actuator 100 includes various on-device controls for user inputs and outputs. For example, external actuator 100 may include a touch strip 104 (also called slider or LED strip). In the illustrated embodiment, touch strip 104 includes a one-axis input device and a one-axis visual display. External actuator 100 further includes various button inputs including power button 106 at the front of the housing, and a set of control buttons 110 at the top of the housing. In an embodiment, control buttons 110 include an RF button 112, a Set button 114, and a Group button 116.

In an embodiment, buttons 106, 110 are physical (moveable) buttons. The buttons may be recessed within housing 102 or may project above the surface of housing 102. In lieu of or in addition to the touch strip and the physical buttons seen in FIG. 1, the input controls may include any suitable input mechanism capable of making an electrical contact closure in an electrical circuit, or breaking an electrical circuit, or changing the resistance or capacitance of an electrical circuit, or causing other state change of an electrical circuit or an electronic routine.

Figure 14:
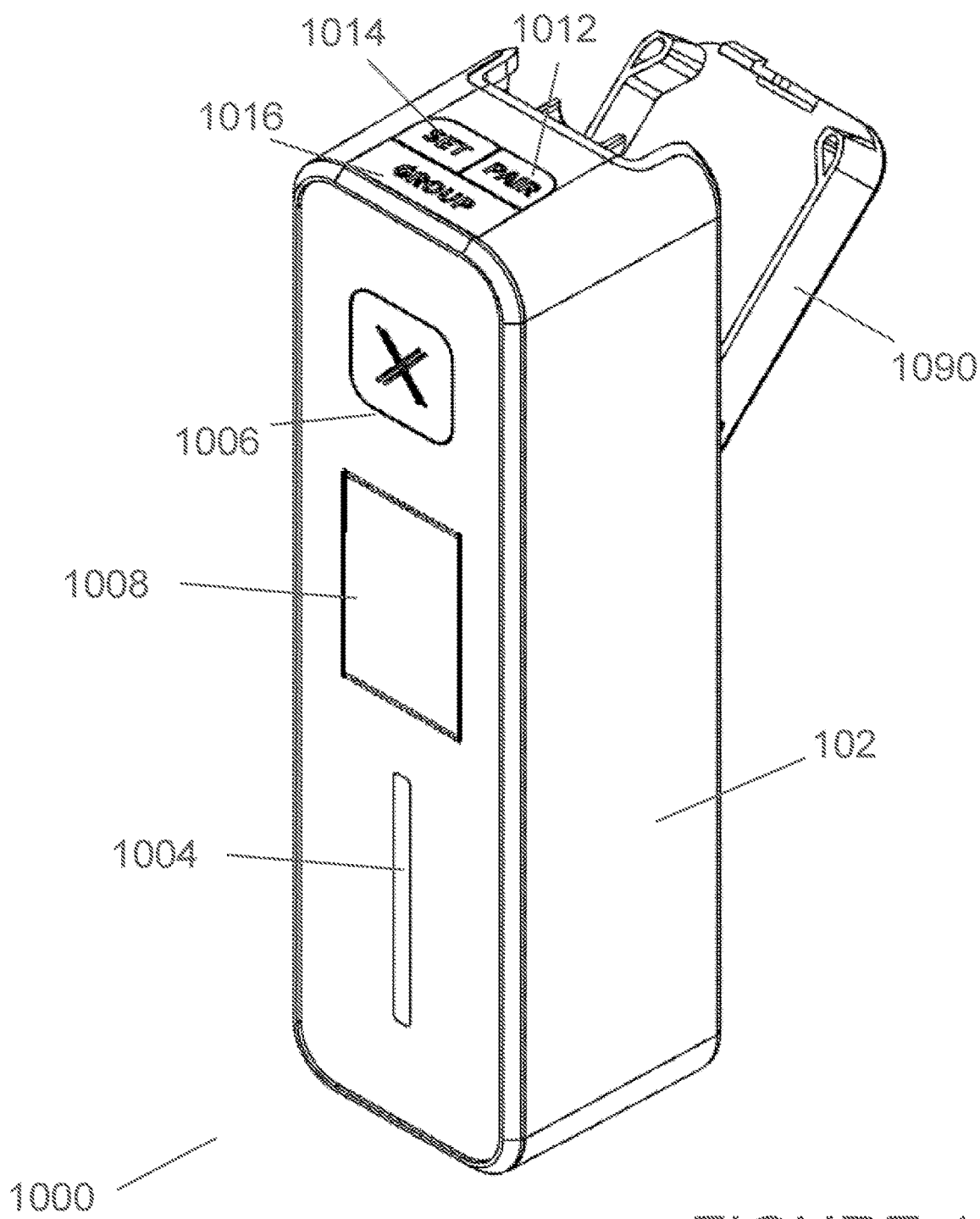
FIG. 14 is an isometric view of an external motor device, according to a further embodiment.

In various embodiments, alternative or additional input devices may be employed, such as various types of sensor (e.g., gesture sensor or other biometric sensor, accelerometer, light, temperature, touch, pressure, motion, proximity, presence, capacitive, and infrared sensors). Other user input mechanisms include touch screen buttons, holographic buttons, voice activated devices, audio triggers, relay input triggers, or electronic communications triggers, among other possibilities, including combinations of these input mechanisms. FIG. 14 shows an alternative external motor 1000 that includes input devices 1004, 1006, 1012, 1014, and 1016 generally corresponding to input devices of motor 100. Additionally, the external motor 1000 includes a two-dimensional screen 1008 located on the front face of external motor 1000 above the LED strip 1004 and below the power button 1006. Two-dimensional screen 1008 may be a touch screen, and may provide various input/output functions such as a virtual keypad, an alphanumeric display, and a graphical user interface, among others.

Referring again to FIG. 1, an input interface of external motor 100 may recognize various user input gestures in generating commands for opening or closing window coverings, and other system functions. These gestures include typing-style gestures such as touching, pressing, pushing, tapping, double tapping, and two-finger tapping; gestures for tracing a pattern such as swiping, waving, and hand motion control; as well as multi-touch gestures such as pinching specific spots on the capacitive touch strip 104. In the cases of a two-dimensional user interface such as touch screen 1008 of FIG. 14, additional user gestures may employed such as multi-touch rotation, and two dimensional pattern tracing. In an embodiment, a two-dimensional input interface 1008 can include a one-axis control that receives user inputs along an input axis.

The on-device controls of the present external motors incorporate a shade positional control input-output (I/O) device such as slider 104. Slider 104 extends vertically on housing 102 along an input axis of the I/O device. The verticality of slider 104 naturally corresponds to physical attributes of shade positioning in mapping given inputs to shade control functions in a command generator, providing intuitive and user-friendly control functions. Examples of shade control I/O positional functionality via slider 104 include, among others:

(a) A gesture at a given slider position between the bottom and top of slider 104 corresponds to given absolute position (height) of the blind as measured by an encoder or other sensor;

(b) A gesture at a given position between the bottom and top of slider 104 corresponds to given relative position of the blind relative to a calibrated distance between a set bottom position and a set top position (e.g., a gesture at 25% from the bottom of slider 104 corresponds to a blind position 25% of the calibrated distance from the set bottom position to the set top position);

(c) Gestures at the top and bottom of the slider 104 can execute different shade control functions depending on the gesture. Pressing and holding the top of the slider 104 is a command for the blind to move continuously upward, while pressing and holding the bottom of the slider 104 is a command for the blind to move continuously downward. Tapping the top of the slider 104 is a command for the blind to move to its top position, while tapping the bottom of the slider 104 is a command for the blind to move to its bottom position.

(d) Upward and downward dynamic gestures (e.g., swiping) on slider 104 can be assigned different functions such as "up" and "down," or "start" and "stop."

Slider 104 provides a versatile input-output device that is well suited to various control functions of a window coverings motor drive system. Various shade control functions may be based on a one-axis quantitative scheme associated with the touch strip 104, such as a percentage scale with 0% at the bottom of the touch strip and 100% at the top of the touch strip 104. For example, the slider 104 can be used to set blind position at various openness levels, such as openness levels 0% open (or closed), 25% open, 50% open, 75% open or 100% (fully) open, via pre-set control options. A user can command these openness levels via slider 104 by swiping, tapping, or pressing various points on the slider. In addition, the slider command scheme can incorporate boundary positions for state changes. For example, a slider input below the one-quarter position of the slider can command the window covering to close from 25% open to 0% open.

Various functions of slider 104 may employ a combination of the one-axis input sensing and one-axis display features of the slider. For example, the LED strip 140 can illuminate certain positions along the touch strip 104, with these illuminated positions corresponding to boundaries along the slider for state changes in a shade command structure.

Figure 21:
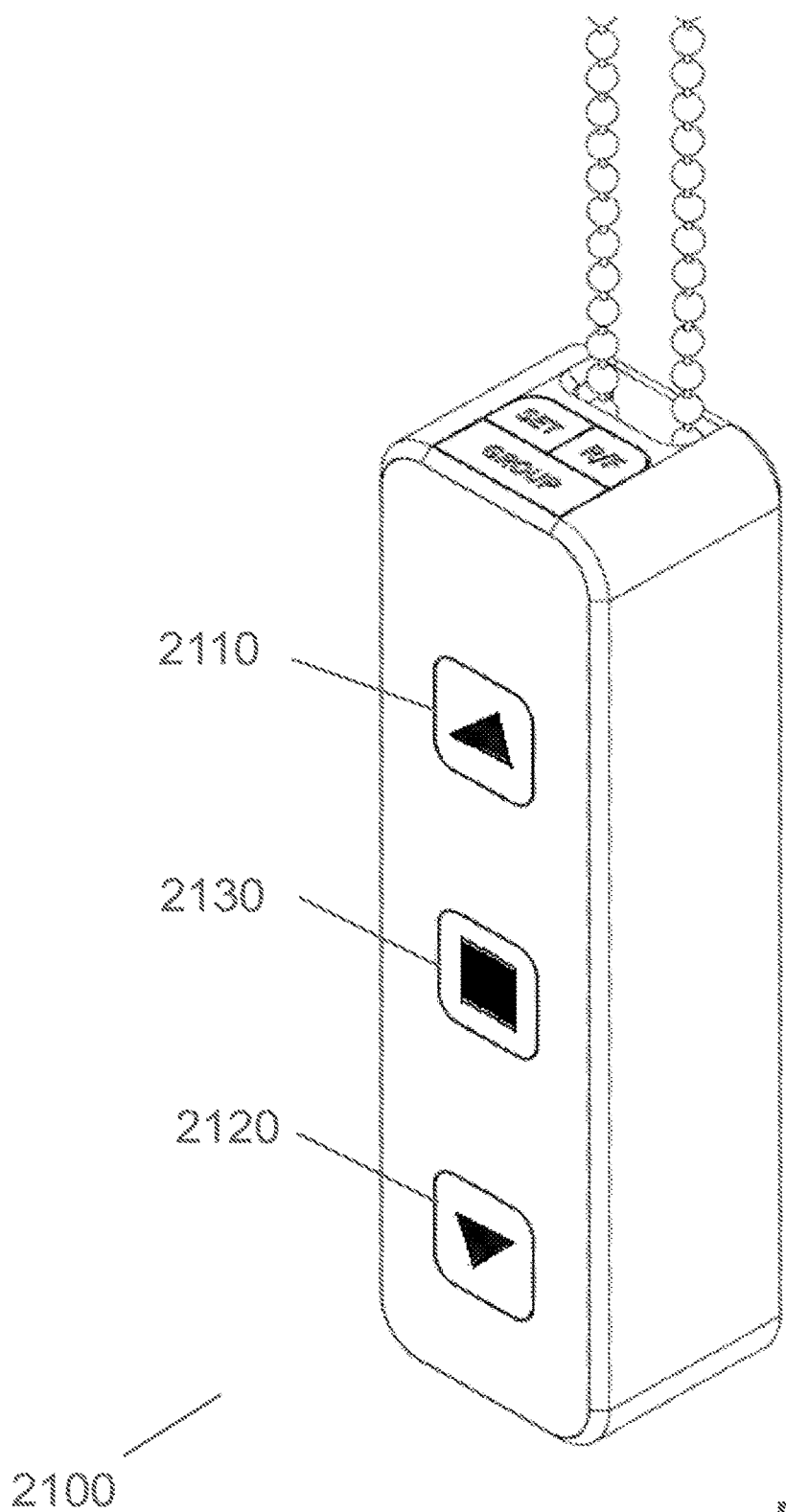
FIG. 21 is an isometric view of an external motor device, according to a further embodiment.

In the external motor device 2100 of FIG. 21, the vertical touch strip input device is replaced by capacitive touch buttons 2110, 2120, 2130 for various motion states. Touch button 2110 actuates up motion, touch button 2120 actuates down motion, and touch button 2130 actuates an idle (stationary) motion state. For example, pressing an up button or down button may cause continuous up or down movement, tapping a button may cause window covering position to move up or down to a next set position, and double tapping a button may cause the window covering position to move to the top or bottom calibrated position.

The input-output principles described above for external motor device on-device controls can be applied to various types of shade positional control input-output (I/O) devices separate from the external motor device on-device control, such as mobile user devices. In various embodiments, the web application emulates the one-axis input sensing and one-axis display features of the external motor on-device controls described above. In various embodiments, the web application utilizes mobile device input technologies such as touch-screen inputs, gesture-based inputs, and GPS location sensing. For example, the web application control may accept inputs such as dragging, tapping, double tapping, multi-touch inputs, and gestures such as tracing a pattern, swiping, waving, and hand motion control. In various embodiments, a two-dimensional I/O device such as a 2D touch screen can be configured to act upon user input along a single axis, e.g., along a vertical axis or a horizontal axis of the touch screen.

FIGS. 15-18 and FIG. 22 are front views of a graphical user interface displayed on an electronic device 1505 (e.g., a mobile electronic device), which present various screens of an external motor control application. The window covering application position control screen 1500 of FIG. 15 includes a vertical slider control 1530 with a bar 1540 that can be set at a desired vertical position via touch screen input. In addition, graphical user interface 1500 includes up-button 1510 and down-button 1520 controls, which may receive various types of touch screen input. For example, pressing a button may cause continuous up or down movement, tapping a button may cause window covering position to move up or down to a next set position (e.g., set position of 75%), and double tapping may cause the window covering position to move to the top or bottom calibrated position.

Figure 16:
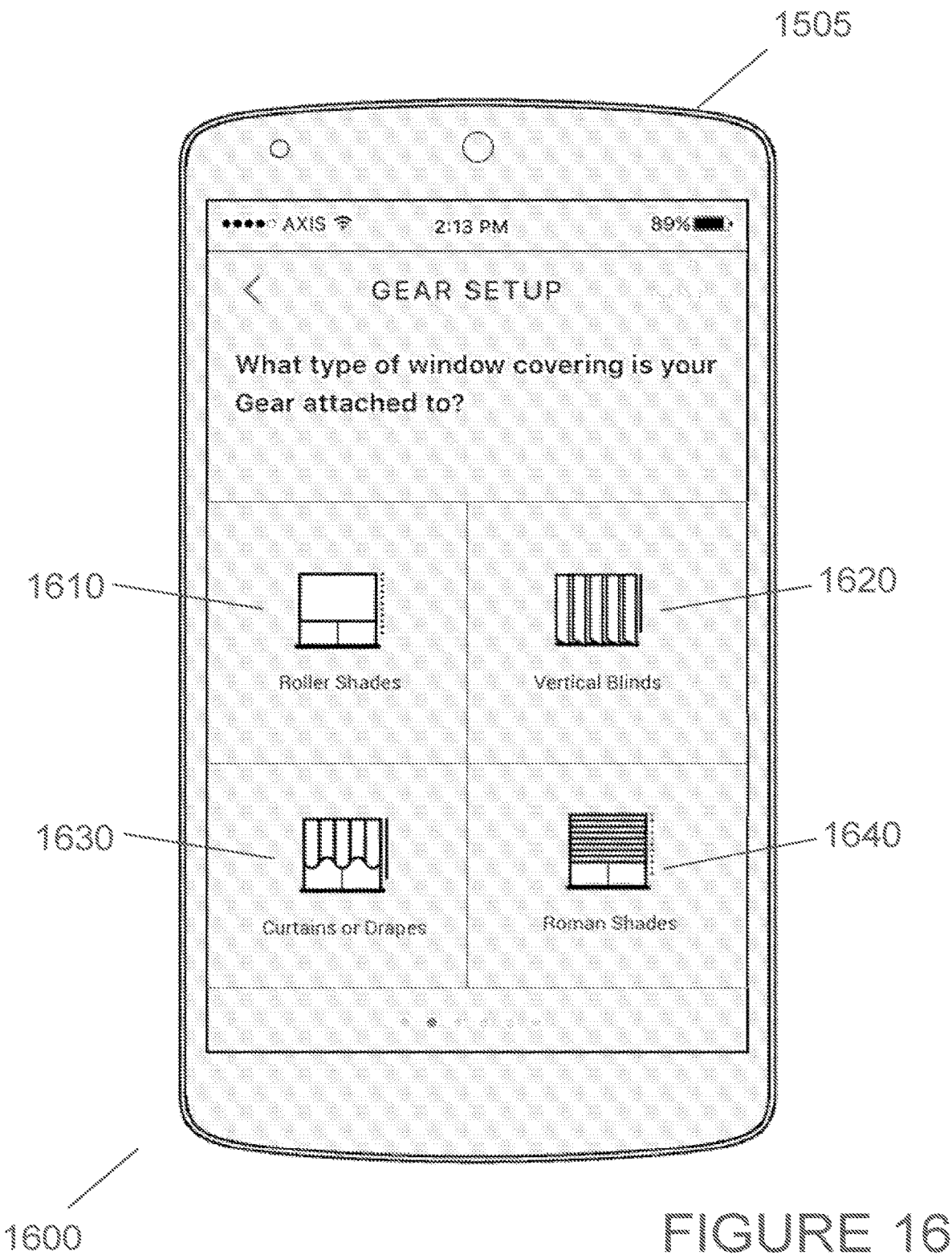
FIG. 16 is a front view of a graphical user interface displayed on an electronic device that presents a window covering type setup screen of an external motor control application, according to an embodiment.

The window covering application setup screen 1600 of FIG. 16 is used for setting up the external motor control application depending on what type or types of window covering devices are installed with external motor control. Window covering device type options include roller shades 1610, vertical blinds 1620, curtains or drapes 1630, and Roman shades 1640. Roller shades 1610 and Roman shades 1640 are characterized by vertical position control, i.e., the external motor device raises or lowers the roller shades or Roman shades. Vertical blinds 1620 and curtains or drapes 1630 are characterized by horizontal position control, i.e., the external motor device opens or closes the vertical blinds or curtains laterally, e.g., across the window frame.

Figure 17:
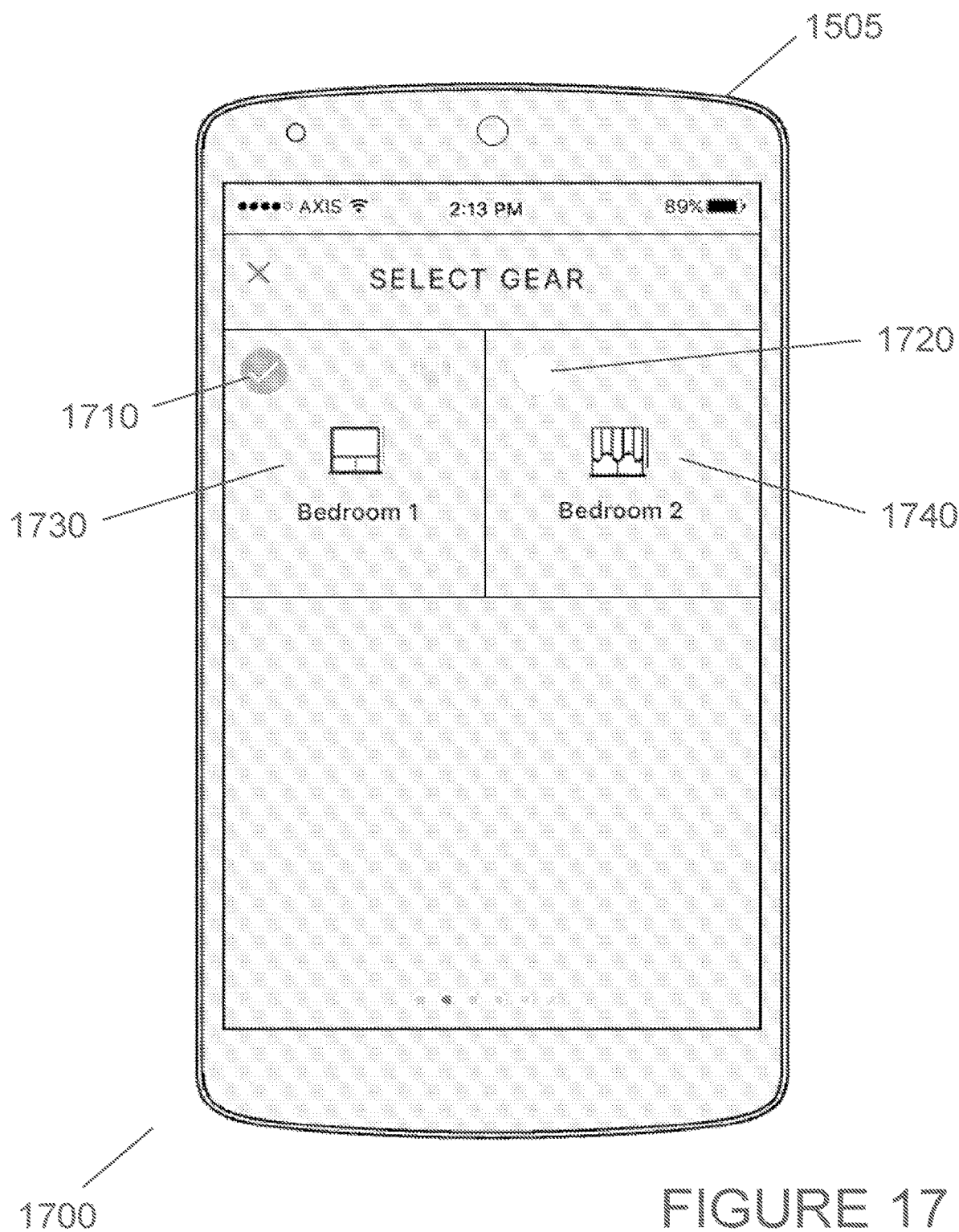
FIG. 17 is a front view of a graphical user interface displayed on an electronic device that presents a window covering device selection screen of an external motor control application, according to an embodiment.

As seen in the window covering application selection screen 1700 of FIG. 17, the external motor control application may be set up to control two or more external motor control devices, e.g., in different rooms or multiple devices in a given room. Following set-up, the user may select one of these devices for control via device selection screen 1700. In the exemplary embodiment, the user has set up two external motor window control devices: a roller shades device 1730 in Bedroom 1 and a curtains or drapes device 1740 in Bedroom 2. The user has selected device 1730 via radio button 1710 for control using the window covering application. Alternatively, the user can select device 1740 via radio button 1720. In various embodiments, in the event an external motor control device selected at the select screen 1700 is associated with roller shades 1610 or Roman shades 1640, the window covering application will display a position control application screen configured for vertical position control. In various embodiments, in the event an external motor control device selected at the select screen 1700 is associated with vertical blinds 1620 or curtains or drapes 1630, the window covering application will display a position control application screen configured for horizontal position control.

Figure 15:
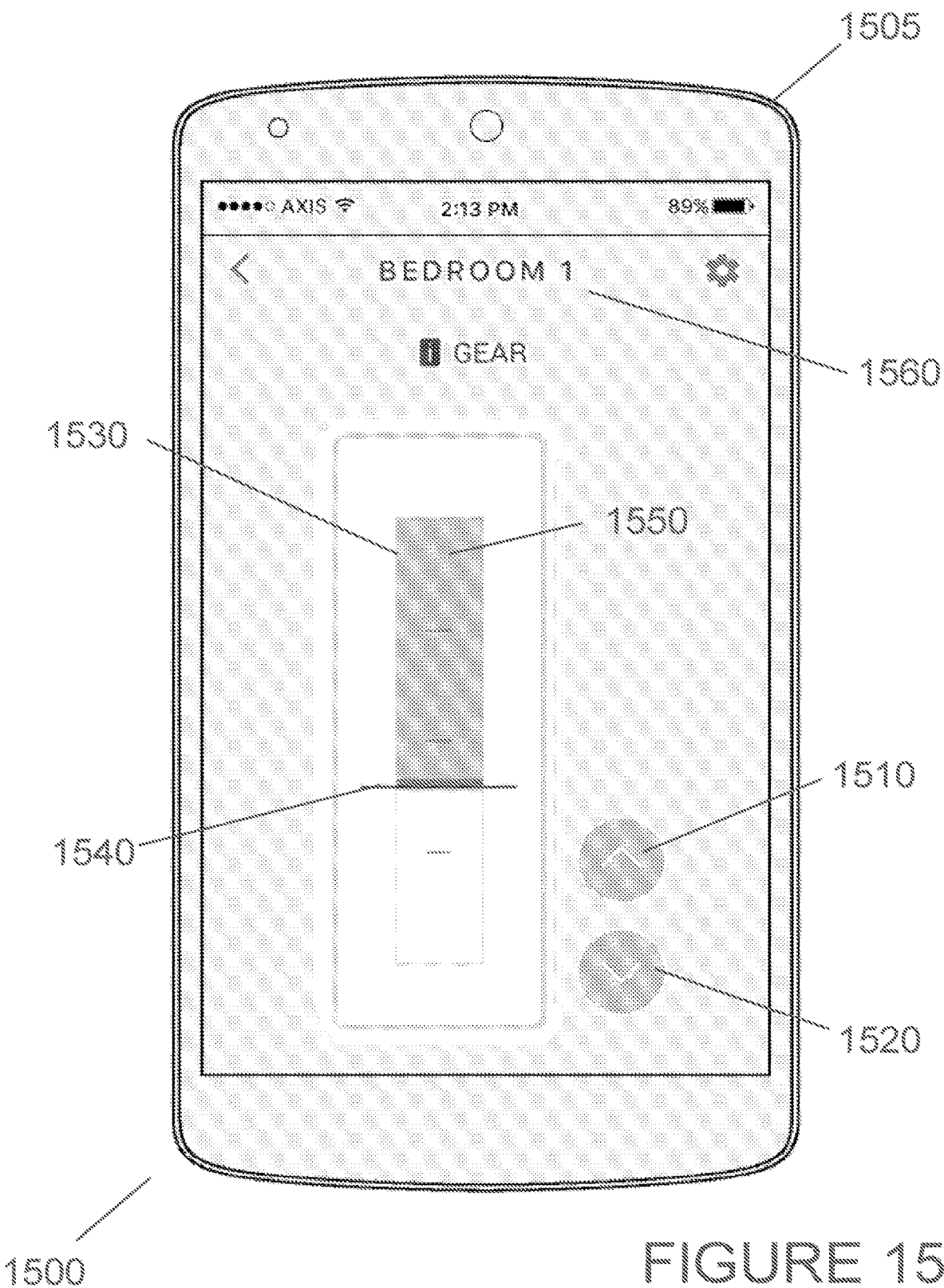
FIG. 15 is a front view of a graphical user interface displayed on an electronic device that presents a position control screen of an external motor control application, according to an embodiment.

In an example of use of the window covering application position control screen 1500 of FIG. 15, the control application has displayed position control screen 1500 following user selection of device location 1710 at selection screen 1700, as shown in window covering device header 1560, "Bedroom 1." For controlling raising and lowering of roller blind 1730, the position control screen 1500 displays a vertical slider control 1530.

Figure 18:
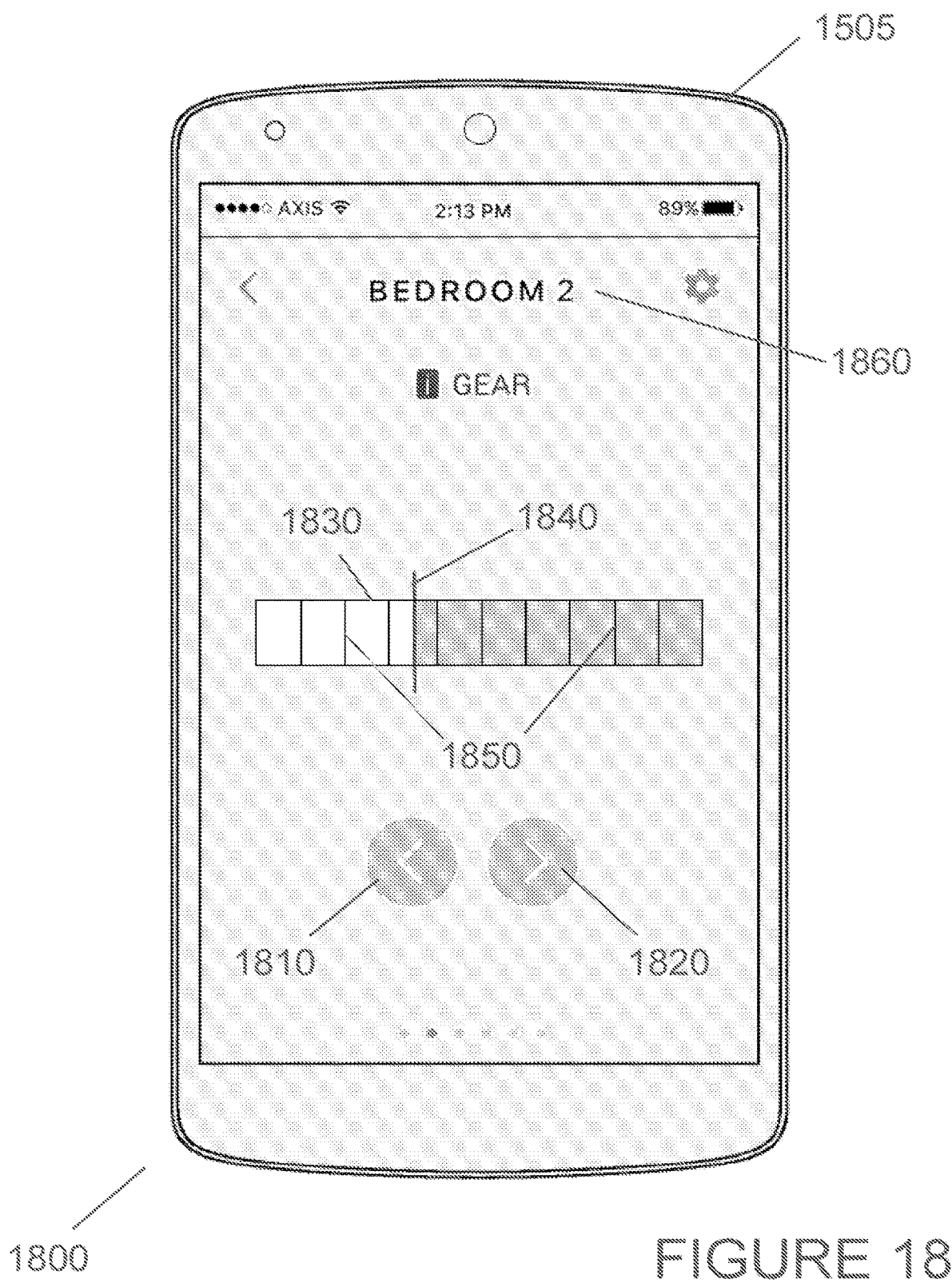
FIG. 18 is a front view of a graphical user interface displayed on an electronic device that presents a position control screen of an external motor control application, according to an embodiment.

The window covering application position control screen 1800 of FIG. 18 includes a horizontal slider control 1830 with a bar 1840 that can be set at a desired horizontal position via touch screen input. Horizontal slider control 1830 is divided into ten segments of horizontal position indicated by vertical bars 1850, and the user can precisely move the window covering device to one of these preset positions via touch screen input (e.g., a position of 80%, where 100% is the right-most position). Position control screen 1800 also includes left-button 1810 and right-button 1820, which can be used respectively to cause movement of the window covering device toward the left or the right. In an example of use of the window covering application position control screen 1800 of FIG. 18, the control application has displayed position control screen 1800 following user selection of device location 1720 at selection screen 1700, as shown in window covering device header 1860, "Bedroom 2." For controlling horizontal opening and closing of curtains or drapes 1740, the position control screen 1800 includes a horizontal slider control 1830.

In addition to window covering application position control screens such as vertical position screen 1500 of FIG. 15 and horizontal position screen 1800 of FIG. 18, the window covering application can include one or more speed control screens. A speed control screen can include a control for setting an absolute value of motor speed as well as a direction of window covering velocity (e.g., up or down, or left or right). Additionally, a speed control screen can include controls to select one of several preset speed settings, such as a radio button control to select one of settings Idle; Low; Medium; and High.

The mapping of given user gestures to given shade control commands, herein also called "positional commands," can distinguish between commands applicable only to the local external motor 100, versus commands applicable to multiple external motors. In an example, double tapping the top of a capacitive touch slider design commands the system to provide 100% openness for all window coverings in a pre-set group of window blinds, rather than just the local blind. In another example, two-finger tapping commands the system to open all the window coverings connected within the network.

Figure 2:
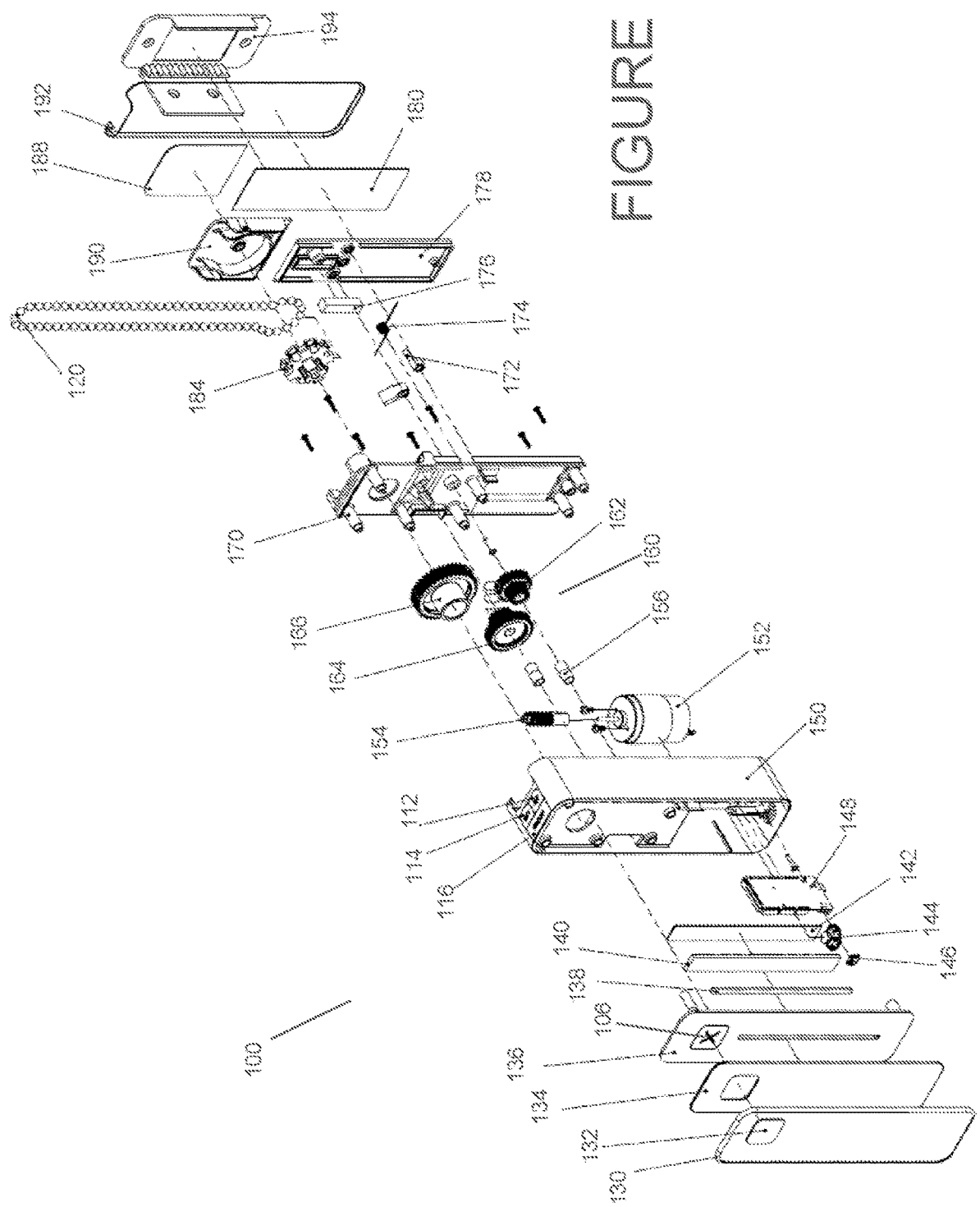
FIG. 2 is an exploded view of disassembled components of an external motor device, according to the embodiment of FIG. 1.
Figure 3:
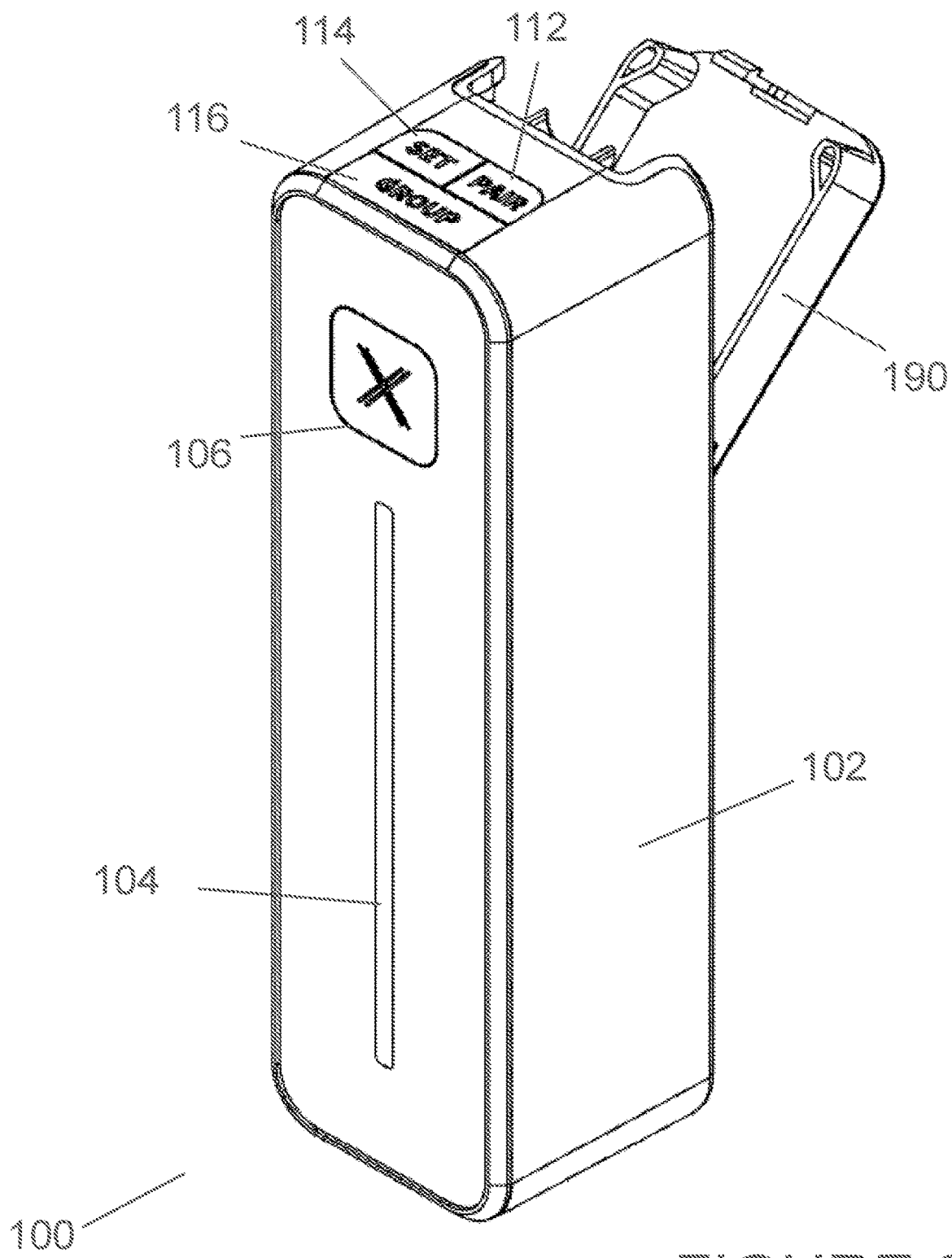
FIG. 3 is an isometric view of an external motor device with sprocket cover in an opened position, according to an embodiment.
Figure 4:
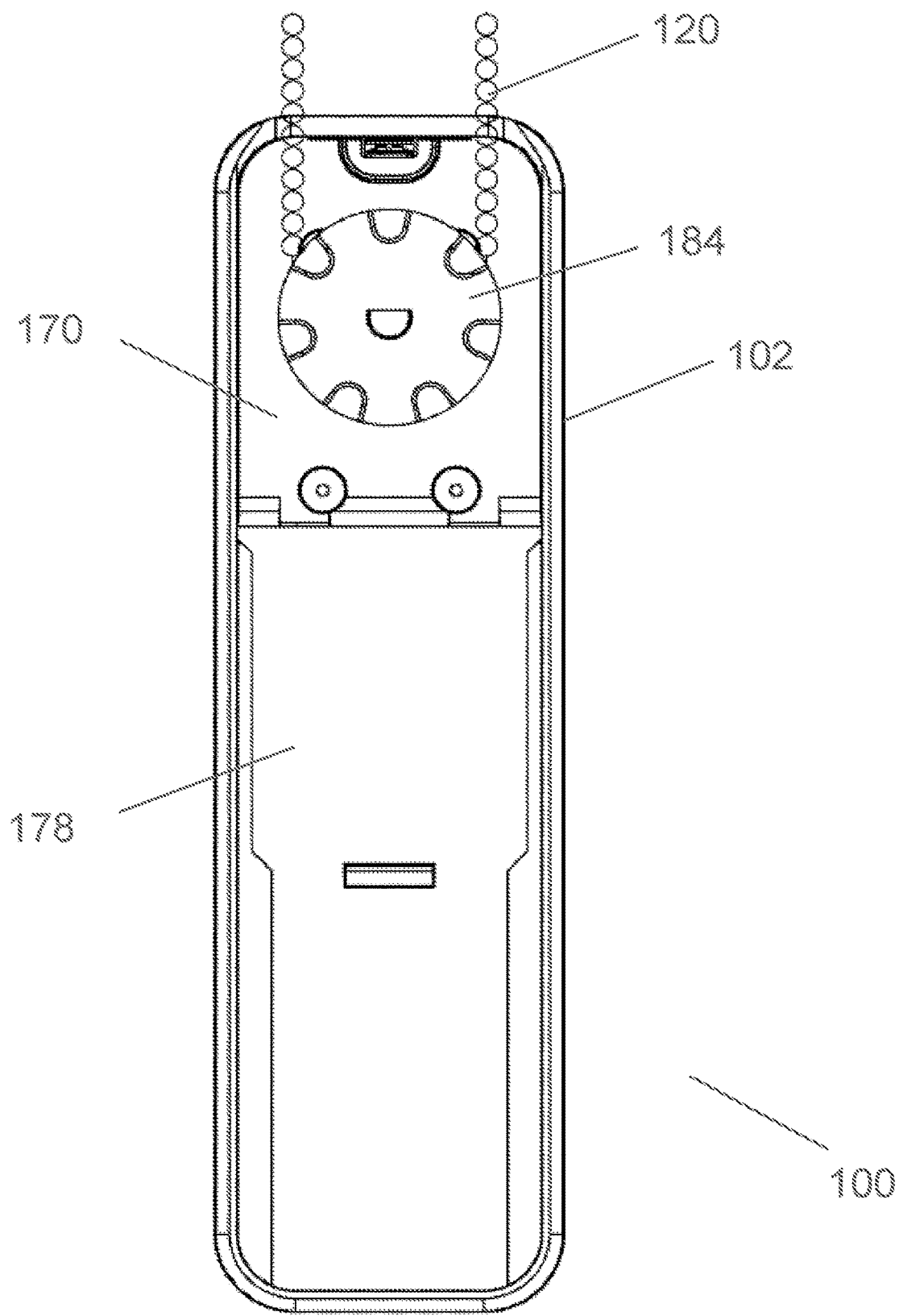
FIG. 4 is an elevational view of an external motor device as seen from the rear, in a section taken through the sprocket, according to the embodiment of FIG. 1.

FIG. 2 is an exploded view of the components of the external actuator 100. Starting with the components at the front of the device at lower left, a front bezel 130 includes a power button glass plate that covers the power button 106. A front lid glass plate 134 includes an aperture for the power button. Front lid 136 houses the power button 106 and serves as a transparent cover plate for the touch strip 104. Visual display components of the one-axis strip 104 include LED strip (also called LEDs) 140 and diffuser 138. The input sensor for one-axis strip 104 is a capacitive touch sensor strip 142. These components serve as an input-output device for the external motor 100, including an input interface that receives user inputs along an input axis, and a visual display aligned with the input axis. When fully assembled, the input-output device extends vertically on the exterior of the housing 102.

Other input/output components include a connector for communications and/or power transfer such as a USB port 146, and a speaker (audio output device) 144. The LEDs and audio outputs of external motor 100 can be used by state machines of external motor 100 to provide visual and/or audio cues to signal an action to be taken or to acknowledge a state change. Visual cue parameters of the LEDs 140 include, for example: (a) different positions of the LEDs indicators (blocks of LEDs) along slider 104; (b) different RGB color values of the LED lights; and (c) steady or flashing LED indicators (including different rates of flashing).

In examples of visual cues involving the group mode function.(incomplete sentence) In an embodiment, the user can press Group Mode button 116 once to cause external motor devices in the network to light up their LED display, informing the user which devices will be controlled. When a user successfully presses the Group Mode 116 button to program external motor 100 to control multiple external motors in its network, the LED strip 140 of all external motors being controlled will change color from steady blue to steady green.

In examples of visual cues involving the Set function, when a user initiates the calibration procedure by pressing and holding the Set button, the LED strip 140 will change to red and blue to inform the user that the external motor 100 is in calibration mode. When the user successfully completes the calibration procedure, the LED strip 140 will flash green to indicate that the shade is now calibrated.

In a visual cue example involving setting position, when a user taps a finger at a particular position along the capacitive touch strip 104, the LED strip 140 illuminates a block of LEDs at this last known position. This indicator informs the user of the position to which the shade will open or close.

In an example of audio cues, an audio alarm sounds to signal a safety issue. In a further example, the speaker 144 broadcasts directions to the user for a shade control function.

Motor drive components are housed between the main body 150 of housing 102 and a back lid 170. The motor components include motor 152 (e.g., a 6V DC motor), and various components of a drive assembly. Components of the drive assembly include a worm gear 154 that is driven by the motor rotation and coupled to a multi-stage gear assembly 160, and a clutch (not shown in FIG. 2). Gear assembly 160 includes helical gear 162 (first-stage gear), a first spur gear 164 (second-stage gear) rotatably mounted on sleeve bearings 156, and a second spur gear 166 (third-stage gear). Printed circuit board 148 houses control electronics for the external motor device 100.

Spur gear 166 is coupled via a clutch (not shown) to a sprocket 184, also called driven wheel, mounted at the rear of back lid 170. Continuous cord loop (chain) 120 is threaded onto sprocket 184 so that the motion of the drive components, if coupled to the driven wheel 184 by a clutch, advances the continuous cord loop 120.

The drive assembly is configured for engaging and advancing the continuous cord loop coupled to a mechanism for raising and lowering the window covering. The drive assembly includes driven wheel 184 and a coupling mechanism (152, 160, clutch) coupling the driven wheel 184 to the output shaft of the motor. The coupling mechanism is configured for rotating the driven wheel 184 in first and second senses. Rotation of the driven wheel in a first sense advances the continuous cord loop in the first direction, and rotation of the driven wheel in a second sense advances the continuous cord loop in the second direction.

Structural components at the back of external motor 100 includes a back lid cover 178, sprocket cover 190, back lid glass plate 180, and sprocket lid glass plate 188. These components are covered by back bezel 192, which is coupled to a bracket 194 that serves as a mounting fixture for the external motor 100.

Figure 9:
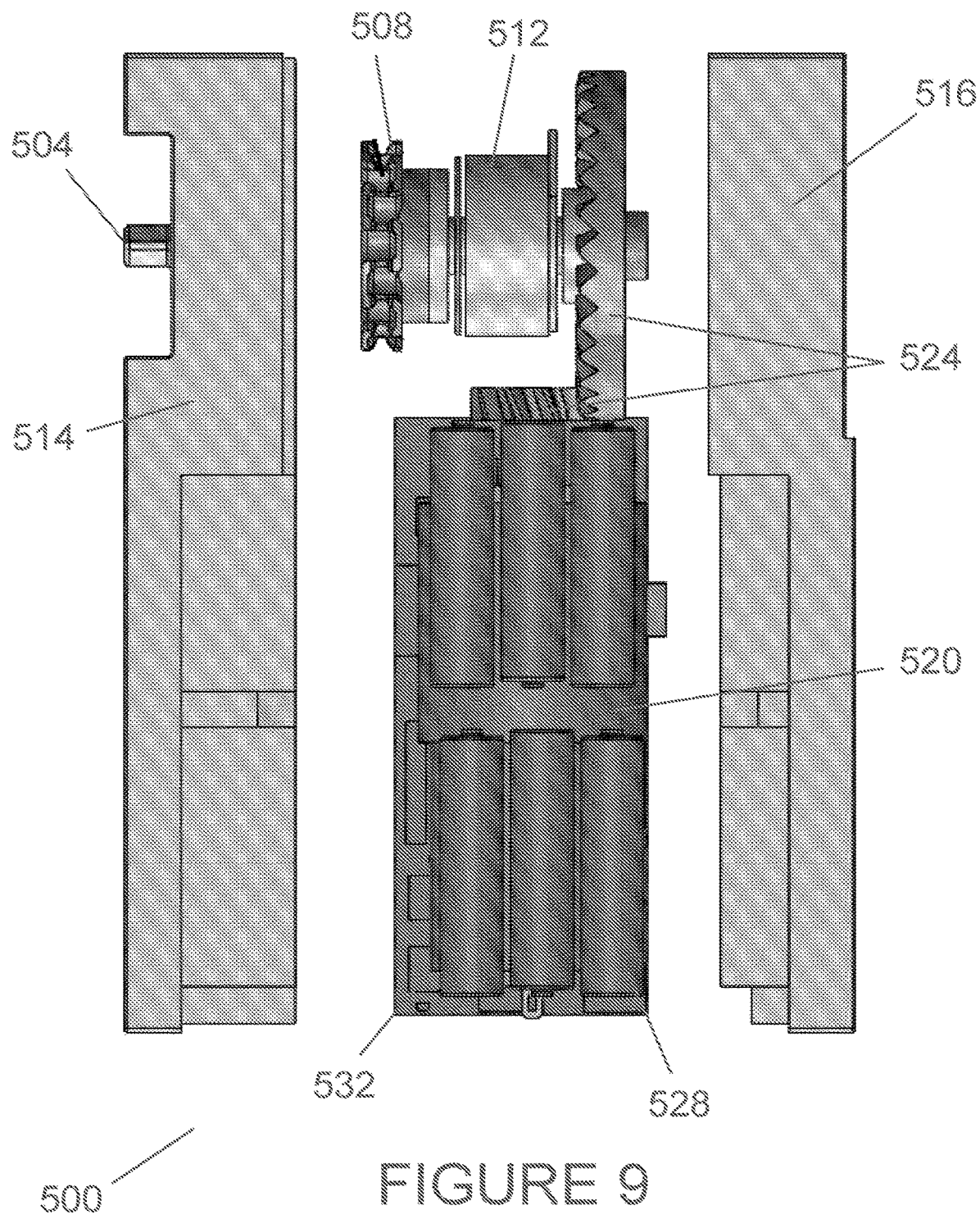
FIG. 9 is an elevation view of disassembled motor drive components for an external motor system, according to the embodiment of FIG. 1.

FIG. 9 is an elevation view of structural components and assembled working components from a motor driven subassembly 500, as seen from one side. Front housing 514 and rear housing 516 envelop the drive train and other operational components of the drive system 500, but are shown here separated from these components. DC motor 520, under power and control from printed circuit board 532 and battery pack 528, has a rotating output shaft. For example, batteries 528 may be nickel-metal hydride (NiMH) batteries, or lithium-ion polymer (LiPo) batteries. Battery pack 528 can be located within the front housing 514 and rear housing 516 as shown, or can be external to these housings. A multi-stage gear assembly 524 includes a gear 526 in line with the motor output shaft, and a face gear 528. The face gear 528 is coupled to driven wheel 508 by clutch system 512. Clutch 512 is a coupling mechanism that includes an engaged configuration in which rotation of the output shaft of the motor 520 (as transmitted by the multi-stage gear assembly) causes rotation of the driven wheel 508; and a disengaged configuration in which the driven wheel 508 is not rotated by the output shaft of the motor. In an embodiment, clutch 512 is an electrically operated device that transmits torque mechanically, such as an electromagnetic clutch or a solenoid. In another embodiment, clutch 512 is a two-way mechanical-only clutch that does not operate under electrical power.

Successive presses of the power button 504 toggle the drive assembly between engaged and disengaged configurations of the clutch system 512. Power button 504 corresponds to power button 106 in the external actuator embodiment 100 of FIGS. 1 and 2. In an embodiment, Power Button 106 turns on or off the device by engaging and disengaging the driven wheel or sprocket 508 respectively with the clutch system 512. In another embodiment, pressing the Power Button 106 triggers power-on and power-off of the external actuator 100.

In one embodiment utilizing a two-way mechanical-only clutch, when Power Button 106 is pressed in an 'on' position, the mechanical clutch will engage the driven wheel with the motor's output shaft and gear assembly. This is a tensioned position in which the mechanical clutch will not allow the driven wheel to be operated by manually pulling or tugging on the front chain/cords 122 or back chain/cords 124. In this engaged configuration, when the external motor 100 receives a shade control command from the on-device controls or another device, it will energize the motor to turn the output shaft and gear, which in turn will turn the driven wheel. When the Power Button 106 is pressed in an 'off' position, the mechanical clutch will disengage the driven wheel from the output shaft and gear, allowing for manual operation of the front chain/cords 122 or back chain/cords 124. In the disengaged configuration, if a shade control command is sent when the clutch is not engaged, the driven wheel will not turn.

In another embodiment, the clutch system is an electromagnetic clutch in which the driven wheel is always engaged with the output shaft and gear assembly. The electromagnetic clutch allows for manual operation of the front chain/cords 222 or back chain/cords 224. This clutch does not lock the driven wheel to the output shaft and gears, but when electrically energised will engage the driven wheel and output shaft and gears.

In a further embodiment, when external motor 100 is turned 'on' or engaged with the driven wheel via the Power Button 106, the system will recognize user tugging on the front chain/cords or the back chain/cords. In one embodiment, when a user tugs on the front chain/cord 122 while the external motor is tensioned, the LEDs associated with the touch strip 104 will flash to notify the user that she can control the device with the capacitive touch strip instead.

In another embodiment, when the external motor is turned 'on' or engaged with the driven wheel via the Power Button 106 and a user tugs on the chain/cord while the drive assembly is tensioned, external actuator 100 will recognize the user's action using sensors and/or encoders, and automatically lower or raise the blinds or take other action based on a command associated with the particular tugging action. The actions mentioned can include tugging on the front chain/cord 122 or the back chain/cord 124.

In an embodiment, a sensor and/or encoder of external motor 100 measures the manual movement of the cords via a "tugging" or pulling action of the cord by a user. Mechanical coupling of the sprocket 184 to the gear assembly 160 includes a certain amount of slack, such that user's tugging on the continuous cord loop 120 will cause a certain amount of movement of the sprocket and this movement will be recognized by a sensor or encoder (e.g., encoder 322, FIG. 7). Based upon the sensor or encoder output, a shade control command structure can include various shade control actions, and engage the motor to execute a given action. Tugging the cord while the external motor 100 is engaged and opening or closing the blind can send various commands, such as stopping the blind from opening/closing.

Examples of tug actions engaging the motor to execute shade control commands:

(a) Downward tugging sensed, engaging the DC motor in the same direction. For example, if the user tugs down the front chain/cords 122, the motor would operate and lower the window shade;

(b) Downward tugging sensed, disengaging the DC motor. For example, if the user tugs down the back chain/cords 124 while the motor is raising or lowering the window shade, the motor will disengage and stop the shade at that position.

(c) Downward tugging sensed, engaging the DC motor in an opposite direction. For example, if the user tugs down the back chain/cords 124, the motor will operate and raise the window shade.

Referring again to FIG. 1, The RF button 112 is used to pair or sync the external motor to a mobile phone via radio-frequency chips (RF) including, but not limited to BLE (Bluetooth Low Energy), WiFi or other RF chips. The RF button 112 can be used to pair or sync to third party devices such smart thermostats, HVAC systems, or other smart-home devices by means of forming a mesh network utilizing RF chips including various protocols. Protocols include but are not limited to BLE (Bluetooth Low Energy) mesh; ZigBee (e.g., ZigBee HA 1.2); Z-Wave, WiFi, and Thread.

Figure 12:
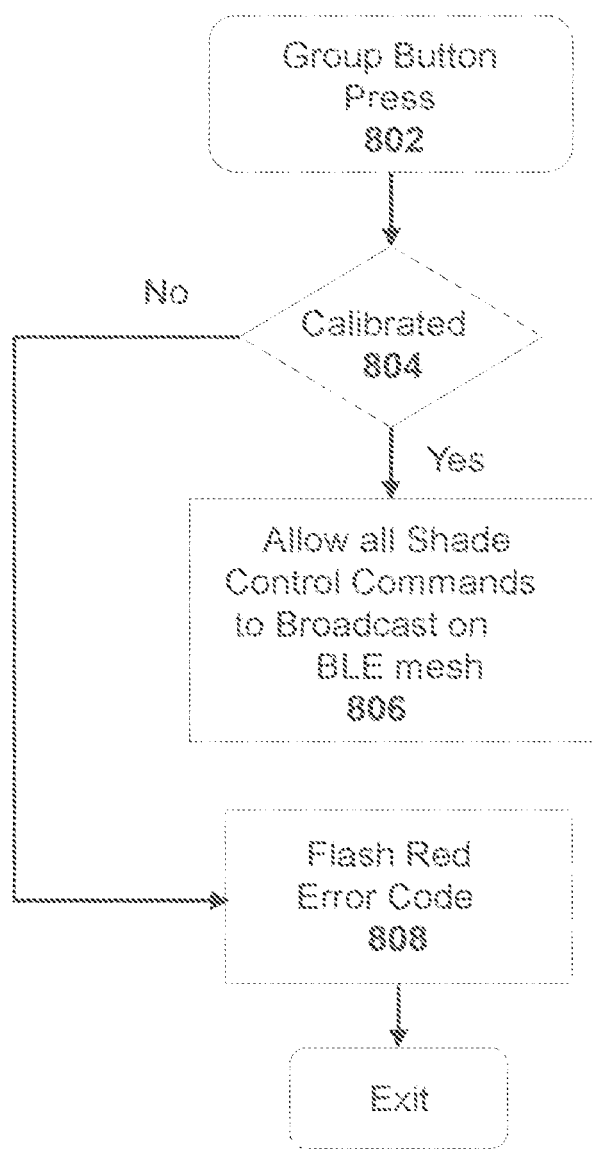
FIG. 12 is a flow chart diagram of a group mode routine, according to an embodiment.
Figure 13:
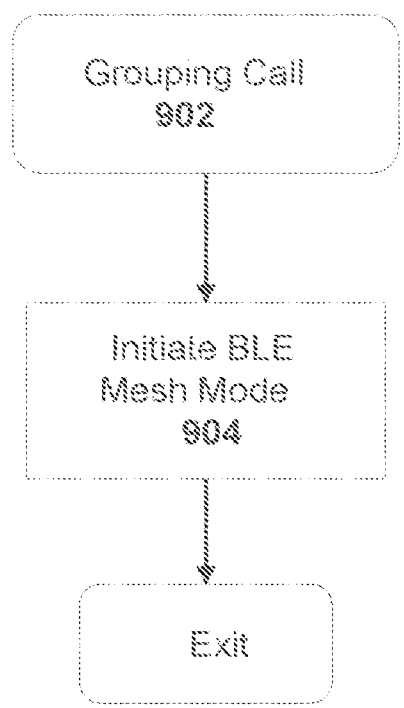
FIG. 13 is a flow chart diagram of a grouping mesh routine, according to an embodiment.

FIG. 13 is a flow chart diagram of a Grouping Mesh routine executed by an external motor in response to a grouping call received at 902. For example, a grouping call may be triggered at 806 in the Group Mode routine of FIG. 12. Upon receiving the grouping call, the external motor initiates BLE mesh mode, thereby communicating messages to other external motors in the group (BLE mesh) using a Bluetooth Low Energy protocol. For external motor networks that use another protocol 330 (FIG. 7) for RF communications, such as ZigBee, Z-Wave, WiFi, or Thread, the grouping call routine would be modified at 804 to initiate communications with other external motors in the group based upon the applicable protocol. Similarly, the grouping call routine can be modified to adapt to different mesh topologies of the external motor network, such as hub-and-spoke (star topology).

The Set button 114 is used for calibrating or pre-setting the maximum opening and closed position of the blind. After the user mounts/installs the external motor 100, the user can calibrate the device to manually set positions at which the blind is fully opened or fully closed. The user then presses the top portion of the capacitive touch slider 104 to raise the blinds all the way up. When the blind has reached the top position, the user again presses the Set button 114 to save the top position. The user then presses the bottom position of the capacitive touch slider control 104 to lower the blinds. When the blind has reached its bottom position, the user again presses the Set button to save the bottom position. The top and bottom positions set by a user can reflect preferences of the user and may vary from one external motor to another.

Figure 10:
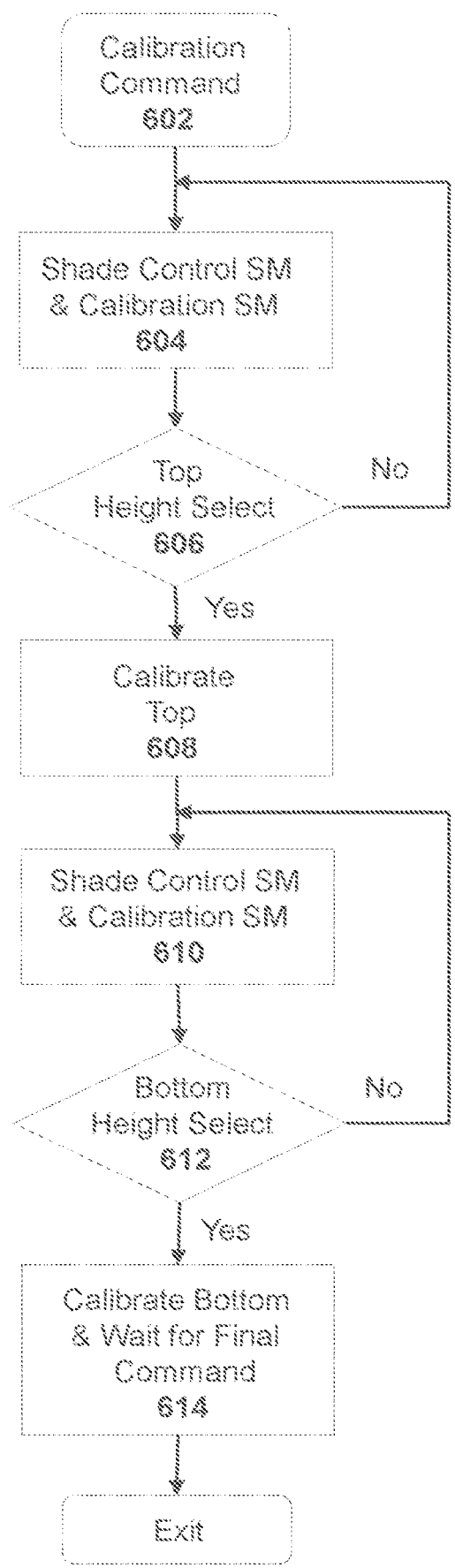
FIG. 10 is a flow chart diagram of a calibration routine for an external motor control system, according to an embodiment.

FIG. 10 is a flow chart diagram of a calibration routine executed by an external motor 100. The calibration routine commences with a calibration command 602, which can be effected by pressing and holding the Set button 114 of an external motor, or in some other way, e.g., input at a mobile device. At 604 the system passes control to the Shade Control state machine and to the Calibration state machine. The Shade Control state machine is discussed below with reference to FIG. 11. The Calibration state machine controls the command structure for LED indicators; calculates top and bottom positions selected by the user based on encoder pulse data; saves these top and bottom positions when confirmed by the user; and calculates distance between top and bottom positions to scale shade control commands to the calibrated positions. In these routines, the user can execute various motor control commands to move the blind to a desired top position. At 606 the system detects whether the user has selected and confirmed the top position by pressing the Set button. If so, the routine saves (calibrates) the top position at 608. At 610 the system again passes control to the Shade Control state machine and to the Calibration state machine. At 621 the system detects whether the user has selected and confirmed the bottom position by pressing the Set button and, if so, saves (calibrates) the bottom position at 614. Upon the user's final confirmation of calibration at 614, the system exits the calibration routine.

In the illustrated embodiment, the calibration procedure sets the top position followed by setting the bottom position. In an alternative embodiment, instead of setting the top position followed by calibrating the bottom position, the calibration procedure sets the bottom position followed by setting the top position.

In another calibration embodiment, the user presses and holds the Set button 114 for a limited period of time to reverse the direction of motion. In this embodiment, if the user presses the top part of the capacitive touch slider control 104 with the intent to raise the blinds, but external motor 100 instead lowers the blind, the user can press and hold Set 114 within a specified timeframe to reverse this direction. The user then presses the top portion of the capacitive touch slider control 104 to completely raise the blinds, and then presses the Set button 114 to set the top position. The user will then press the bottom portion of the capacitive touch slider control 104 to lower the blinds, and then press the Set button 114 to set the bottom position.

In a further calibration embodiment, the user can press Set for auto-calibration. During auto-calibration, the external motor determines top and bottom positions via predetermined sensor measurements.

Figure 11:
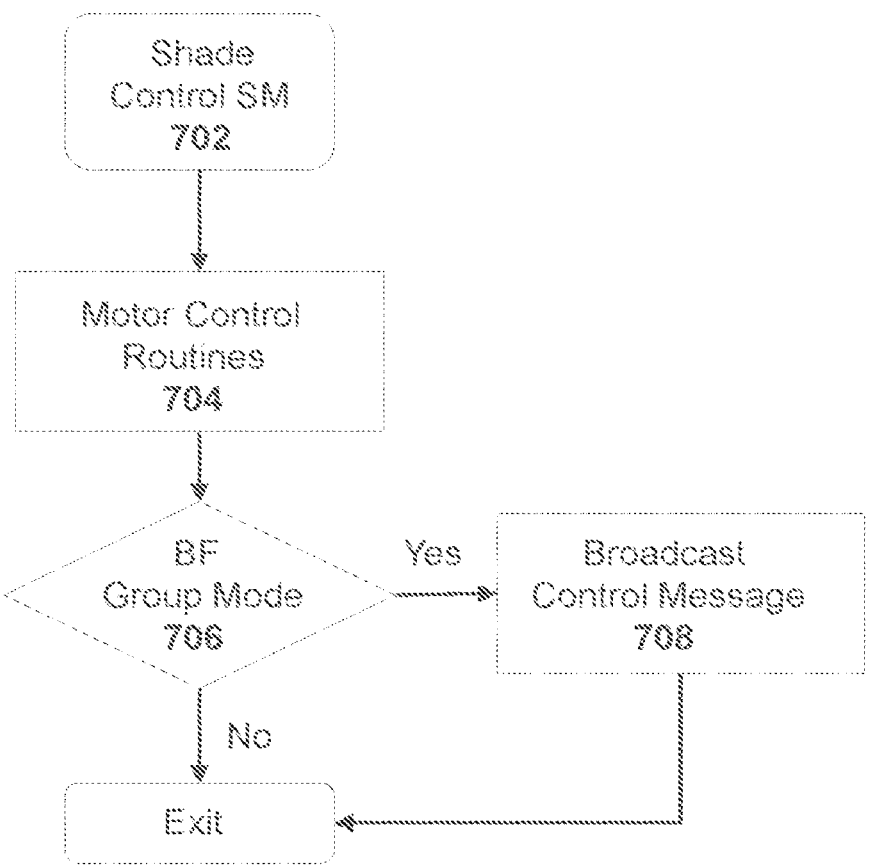
FIG. 11 is a flow chart diagram of a shade control routine, according to an embodiment.

FIG. 11 is a flow chart diagram of a Shade Control routine executed by an external motor 100. At 702 the system receives a command to pass control to the Shade Control state machine. At 704 the system passes control to motor control routines. Motor control routines start and stop the motor; move the motor in a selected direction (up/down); move the motor to a selected position; and regulate the speed of the motor. Motor control routines are typically triggered by user commands, but can also be automated, e.g., upon sensing a condition affecting safety. At 706, the system detects whether Group Mode is active for the external motor. If yes, the external motor's control system broadcasts 708 a shade control message to other motors in the group for execution. Shade control commands executed in response to the message 708 may vary among different external motors in a group. For example, shade control commands based on calibrated positions will vary depending on the top and bottom positions calibrated for each external motor. If the Group Mode is not active, the external motor exits the shade control routine at 706; otherwise it exits the routine at 708 after broadcasting the shade control message.

In various embodiments, the Shade Control routine executed by external motor 100 is configured to limit acceleration of the motor from an idle (stationary) state to full operating speed, and to limit deceleration of the motor from full operating speed back to the idle state. In various embodiments, the Shade Control routine causes the external motor 100 to ramp up speed from the idle state to full speed, and causes the external motor 100 to ramp down speed from full speed back to the idle state. These functions of ramping up motor speed from the idle state, and ramping down motor speed back to the idle state, are also called ramp trajectory speed control in the present disclosure. For example, ramp trajectory speed control may provide linear ramp-up or ramp-down of motor speed. The Applicant has observed that ramp trajectory speed control reduces or avoids stresses on the continuous cord loop in the window covering drive system that can occur due to excessive accelerations, and that these stresses can stretch, weaken, or otherwise damage the continuous cord loop such as a rope, cord, or beaded chain.

In an embodiment, a motor ramp trajectory procedure includes control commands that can be received by the control system via wireless communication (e.g., Bluetooth control), touch-screen control, or automated schedule entry, among other possibilities. The command structure is described, for example, in the following pseudocode:

```
cmd_code.data.shade_pos
    This command has values from 0x00 and 0x64 corresponding to
0-100%
    motor position control.
cmd_code.data.motor_pwm
    This command selects between a slow mode or a fast mode of motor
    ramp trajectory, by assigning 1 or 0 values respectively.
cmd_code.cmd
    CTRL_PROTO_POS value of this command indicates that a command
    should be sent to a top control state machine (also herein called the top
    state machine).
topSM_task
    In addition to the top control state machine, there are various subsidiary
    state machines. topSM_task_runs a gear_topsm_doStep task to manage
    distribution of control and commands to subsidiary state machines for
    calibration, touch LED, motor control, and other functions.
```

A scheduler runs the top state machine and other tasks on periodic schedules. In an exemplary embodiment, a basic timer interval is 8 ms, so all tasks are run in multiples of 8 ms. The top state machine is run every 24 ms. A motor trajectory control task (motorTrajectorySM_task) is run every 104 ms. As described in the following pseudocode, a gear_topsm_doStep state machine called shade_sm_doStep. This state transitions to idle if the state machine returns a "complete" value.

```
Case GEAR_SM-STATE_POSITIONING:
    //UartPrintf ("POSITIONING"\R\N");
    Complete = shade_sm_doStep(st);
    break
shade_sm_doStep
```

In the following pseudocode, the shade_sm_doStep command takes the position command and calculates a heightSelect value using the height_calcPos(shade_pos) function. HeightSelect is the encoder value corresponding to the height percentage received from the command structure. A motor_doPos function determines the direction of movement when initiating motor rotation, and selects motor_pwm (a Pulse Width Modulation value) based on this determination:

```
Case SHADE_SM_CTRL_POS:
    if (transition)
    {
        heightSelect = height calcPos (st→shade_pos);
        posfdbk[2] = st→shade_pos; //assign feedback pos
        UartPrintf("SM_POS:");PrintNum(st→shade_pos);
        OnDeviseMesh(st→shade_pos);
        mtr_cmd.mtr_pos = st→shade_pos;
        complete = motor_doPos(st→motor_pwm);
    }
    break;
```

The motor_doPos function creates the following command structure to be used solely for motor trajectory control by the motor_trajectory_sm_doStep state machine. This state machine is run by the motorTrajectorySM_task.

```
mtr_cmd.mtr_dir = takes either a MOTOR UP value or
MOTOR DOWN value
mtr_cmd.mtr_mod = PWM (pulse width modulation) mode
mtr_cmd.mtr_cmd = takes a 1 value for a new command
```

The motor_trajectory_sm_doStep state machine grabs the above command structure in its next execution cycle to begin operation of ramp control. This state machine manages motor ramp control from motor a stationary (idle) state, as well as any command interrupting a running motor. The state machine includes the following ramp trajectory functions, among others: (a) ramps up from an idle state; (b) when the motor is in a running state, causes the motor to slow down and stop; (c) when the motor is in a running state, causes the motor to ramp in opposite direction, in response to a command requiring opposite movement; and (d) when the motor is in a running state, causes the motor to continue running to a new position, in response to a command requiring movement in the same direction as current movement. The ramp trajectory functions are described in the following pseudocode:

```
typedef enum_attribute_ ((_packed_))
{
    MOTOR_PROFILE_IDLE,
```

-continued

```
    MOTOR_PROFILE_DIRECTION,
    MOTOR_PROFILE_WAIT,
    MOTOR_PROFILE_STOP,
    MOTOR_PROFILE_RAMP_UP,
    MOTOR_PROFILE_RUN,
    MOTOR_PROFILE_RAMP_DOWN
} motor profile states t;
```

Figure 20:
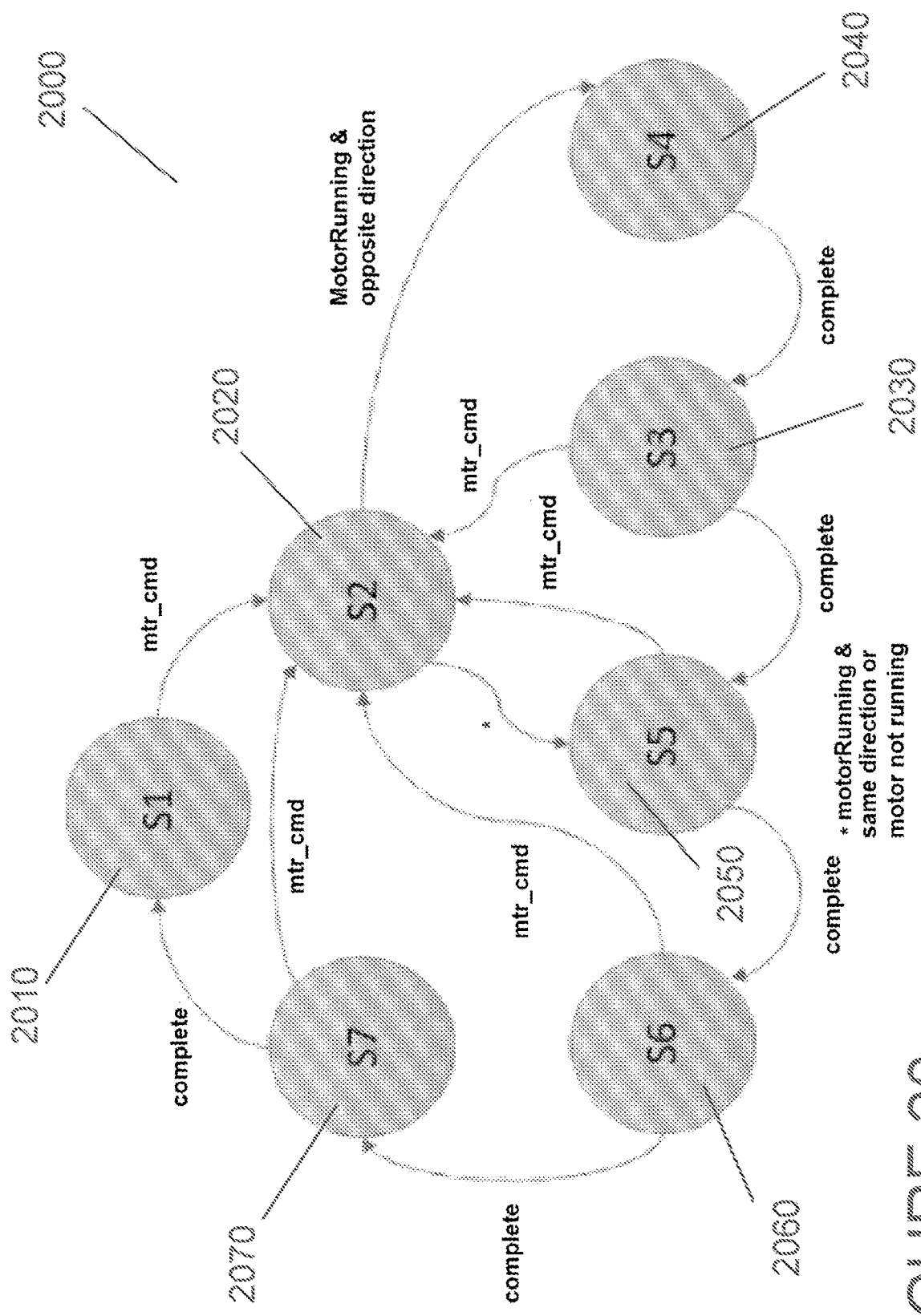
FIG. 20 is a schematic diagram of motor ramp trajectory state machines, according to an embodiment.

FIG. 20 is a state flow graph of motor ramp trajectory state machines, which are built upon the following finite state machine flow:

| | | |
|---|---|---|
| S1: | MOTOR_PROFILE_IDLE | - 2010 |
| S2: | MOTOR_PROFILE_DIRECTION | - 2020 |
| S3: | MOTOR_PROFILE_WAIT | - 2030 |
| S4: | MOTOR_PROFILE_STOP | - 2040 |
| S5: | MOTOR_PROFILE_RAMP_UP | - 2050 |
| S6: | MOTOR_PROFILE_RUN | - 2060 |
| S7: | MOTOR_PROFILE_RAMP_DOWN | - 2070 |

The state transitions for these finite state machines are shown in FIG. 20. New commands are denoted by mtr_cmd, which creates a transition from any state to MOTOR_PROFILE_DIRECTION state S2 2020. MOTOR_PROFILE_DIRECTION state S2 2020 decides whether to stop the motor or to ramp up, based on the current position and the motor running state. Once a state has completed its function, the process flow progresses with a complete transition flowing back to the MOTOR_PROFILE_IDLE state S1 2010, to await new commands.

In an exemplary implementation, the motor ramp trajectory state machine increments the motor PWM from 0 to 200 in steps of 20. With the motor ramp trajectory state machine running every 104 ms, incrementing PWM requires about 1 second to ramp up. In an embodiment, the motor ramps PWM down from 200 to 0 in one step. Since the motor naturally ramps down due to inertia, this ramp time has been observed to be sufficient to avoid undue stress on continuous cord loop beaded chains. In an embodiment, motor ramp trajectories are determined automatically by the control system. In an embodiment, the user can modify default motor ramp trajectories during system set-up.

The Group button (FIG. 1; also herein called Group Mode button) 116 adds multiple external motors 100 within a network into groups in order to control these external motors simultaneously. In one embodiment, Group Mode allow a user to control all external motors within the group from one external motor 100. In an embodiment, to add additional external motors into a group, the user presses and holds the Group button 116 to enter pairing mode. The LED lights of touch strip 104 will flash orange to indicate the device is in pairing mode. In one embodiment, the user presses and holds, within a specified timeframe, the Group buttons of all external motors of the network she wants to add into the group. The LEDs color will turn from orange to green for all external motors that have been added to the group to indicate that pairing is successful. In another embodiment, the user can press the Group button 116 once to remove a device that is currently in the group, so that the Group button executes a toggle function to add or subtract the external motor from the group. In an embodiment, the user presses the Set button 114 to complete the pairing and linking of the external motors in the group.

To control a group of external motors that are linked or synced together, the user can activate group control by pressing the Group button 116. In an embodiment, this changes the LEDs on the capacitive touch slider 104 to a different color. All external motors in this group will light or flash the same LED color to indicate that the external motors are now in group control mode. The user can then set the position of the blind by using the capacitive touch slider control 104 to control all linked devices.

FIG. 12 is a flow chart diagram of a Group Mode routine executed by an external motor 100. The group mode routine triggers shade control actions by other external motors within a group in response to a shade control command at the given external motor, once the user has set up the group. At 802 the routine commences upon pressing the Group button. Alternatively, the Group Mode routine may commence upon receipt of a Group Mode command from another device recognized by the external motor, such as a smartphone, smart hub, or third party device. At 804 the system determines whether the external motor has been calibrated. If the external motor has not been calibrated, the external motor's LED strip displays a flashing red error code. This notifies the user that the external motor must be calibrated before sharing shade control commands (positional commands) with other external motors in the group. If the external motor has been calibrated, the system allows all shade control commands to be broadcast to other external motors in the group on the network (e.g., BLE mesh). The system exits the Group Mode routine after flashing an error code, or after broadcasting the positional commands.

Figure 7:
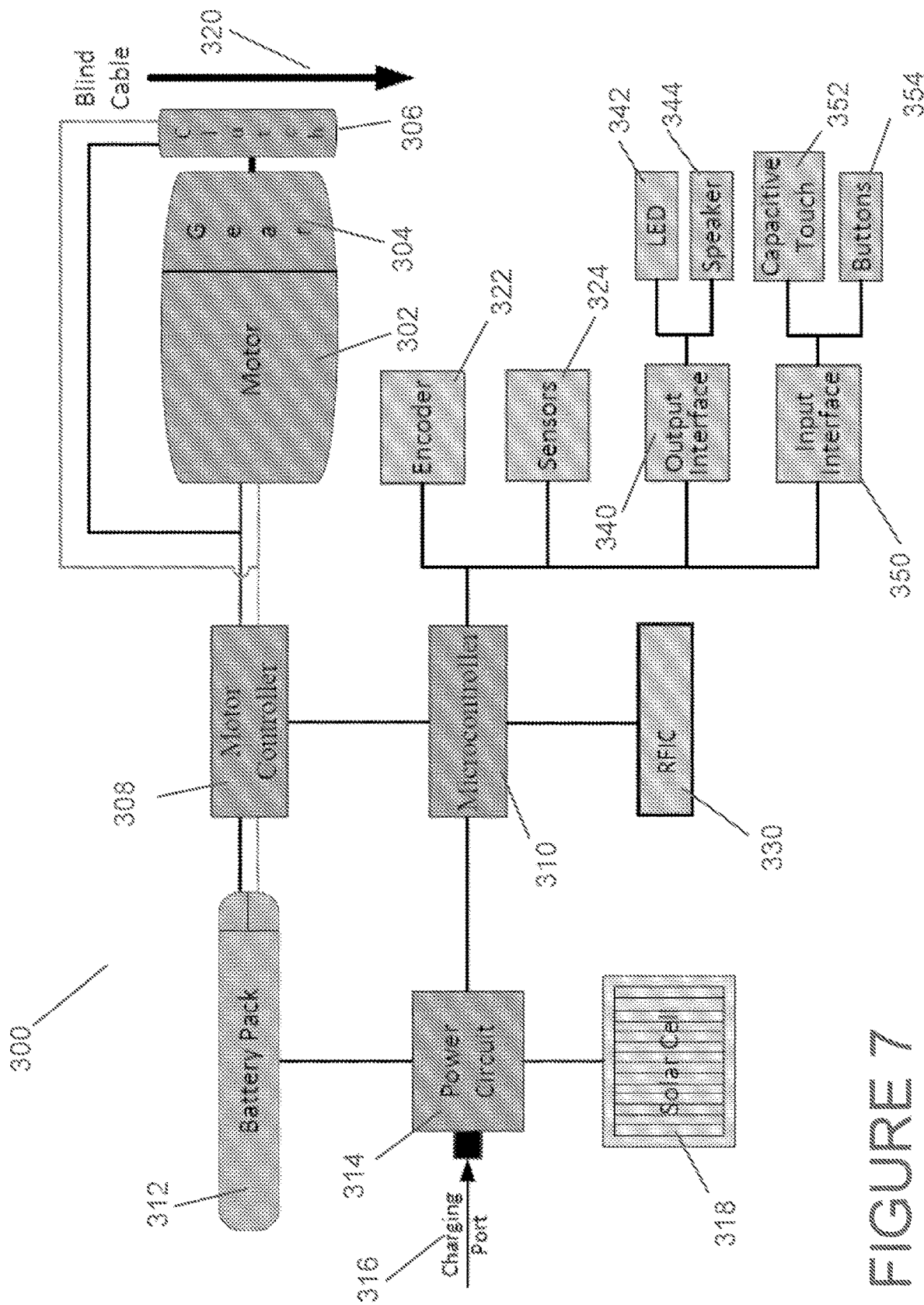
FIG. 7 is a block diagram of a control system architecture of an external motor device for a window covering system, according to an embodiment.

FIG. 7 is a diagram of a motor driven control system 300 for continuous cord loop driven window covering systems. Control system 300 includes DC motor 302, gear assembly 304, and clutch 306. DC motor 302 and clutch 306 are both electrically powered by a motor controller 308. Power sources include battery pack 312. Users may recharge battery pack 312 via power circuit 314 using a charging port 316, or a solar cell array 318.

The central control element of control system 300 is microcontroller 310, which monitors and controls power circuit 314 and motor controller 308. Inputs to microcontroller 310 include motor encoder 322 and sensors 324. In an embodiment, sensors 324 include one or more temperature sensors, light sensors, and motion sensors. In an embodiment, control system 300 regulates lighting, controls room temperature, and limits glare, and controls other window covering functions such as privacy.

In an embodiment, microcontroller 310 monitors current draw from the motor controller 308, and uses this data to monitor various system conditions. For example, using current draw sensing, during calibration the control system 300 can lift relatively heavy blinds at a slower speed, and relatively lighter blinds at a faster speed. In another embodiment, microprocessor 310 monitors the current draw of the motor to determine displacements from the constant current draw as an indication of position of the window covering and its level of openness. For example, assuming the blind is fully closed (0% openness), if the current draw is at an average of 1 amp while raising the window covering, the current draw may spike to 3 amps to indicate that the fabric is rolled up and the window blind is in a fully open position (100% openness).

In another embodiment, monitored current draw measurements are analyzed to determine the direction of the driven wheel, and thereby to determine the direction in which the window blind is opening or closing. In an example, the external motor drive rotates the driven wheel one way, then the opposite way, while monitoring current draw. The direction that produces the larger current draw indicates the direction in which the blind is opening. This method assumes that more torque (and greater current draw) is needed to open a window, and less torque (and lower current draw) is needed to close a window.

In addition, microcontroller 310 may have wireless network communication with various RF modules via radio frequency integrated circuit (RFIC) 330. RFIC 330 controls two-way wireless network communication by the control system 300. Wireless networks and communication devices can include local area network (LAN) which may include a user remote control device, wide area network (WAN), wireless mesh network (WMN), "smart home" systems and devices such as hubs and smart thermostats, among numerous other types of communication device or system. Control system 300 may employ standard wireless communication protocols such as Bluetooth, WiFi, Z-Wave, ZigBee and Thread.

Output interface 340 controls system outputs from microprocessor 310 to output devices such as LEDs 342 and speaker 344. Output interface 340 controls display of visual cues and audio cues to identify external motor control system states and to communicate messages. Input interface 350 controls system inputs from input devices such as capacitive touch device 352 and buttons 354. Input interface 350 recognizes given user inputs that can be mapped by microprocessor 310 to shade control functions in a command generator. For example, input interface 350 may recognize given user finger gestures at a touch strip or other capacitive touch device 352.

In an embodiment, encoder 322 is an optical encoder that outputs a given number of pulses for each revolution of the motor 302. The microcontroller 310 advantageously counts these pulses and analyzes the pulse counts to determine operational and positional characteristics of the window covering installation. Other types of encoders may also be used, such as magnetic encoders, mechanical encoders, etc. The number of pulses output by the encoder may be associated with a linear displacement of the blind fabric 204 by a distance/pulse conversion factor or a pulse/distance conversion factor. For example, with reference to FIG. 5, when the window blind 204 is at a fully closed position (0% openness), a button of external motor 210 can be pressed and held to have the window blind raise to the top of the window frame, and the button can be released once at the top. The external motor 210 is able to measure this travel as the total length (height) of the fabric 204 and thus determine its fully open position, fully closed position, and levels of openness in between.

In an embodiment, control system 300 monitors various modes of system operation and engages or disengages the clutch 306 depending on the operational state of system 300. In one embodiment, when DC motor 302 is rotating its output shaft under user (operator) control, or under automatic control by microcontroller 310, clutch 306 is engaged thereby advancing continuous cord loop 320. When microcontroller 310 is not processing an operator command or automated function to advance the continuous cord loop, clutch 306 is disengaged, and a user may advance continuous cord loop manually to operate the windows covering system. In the event of power failure, clutch 306 will be disengaged, allowing manual operation of the windows covering system.

Figure 8:
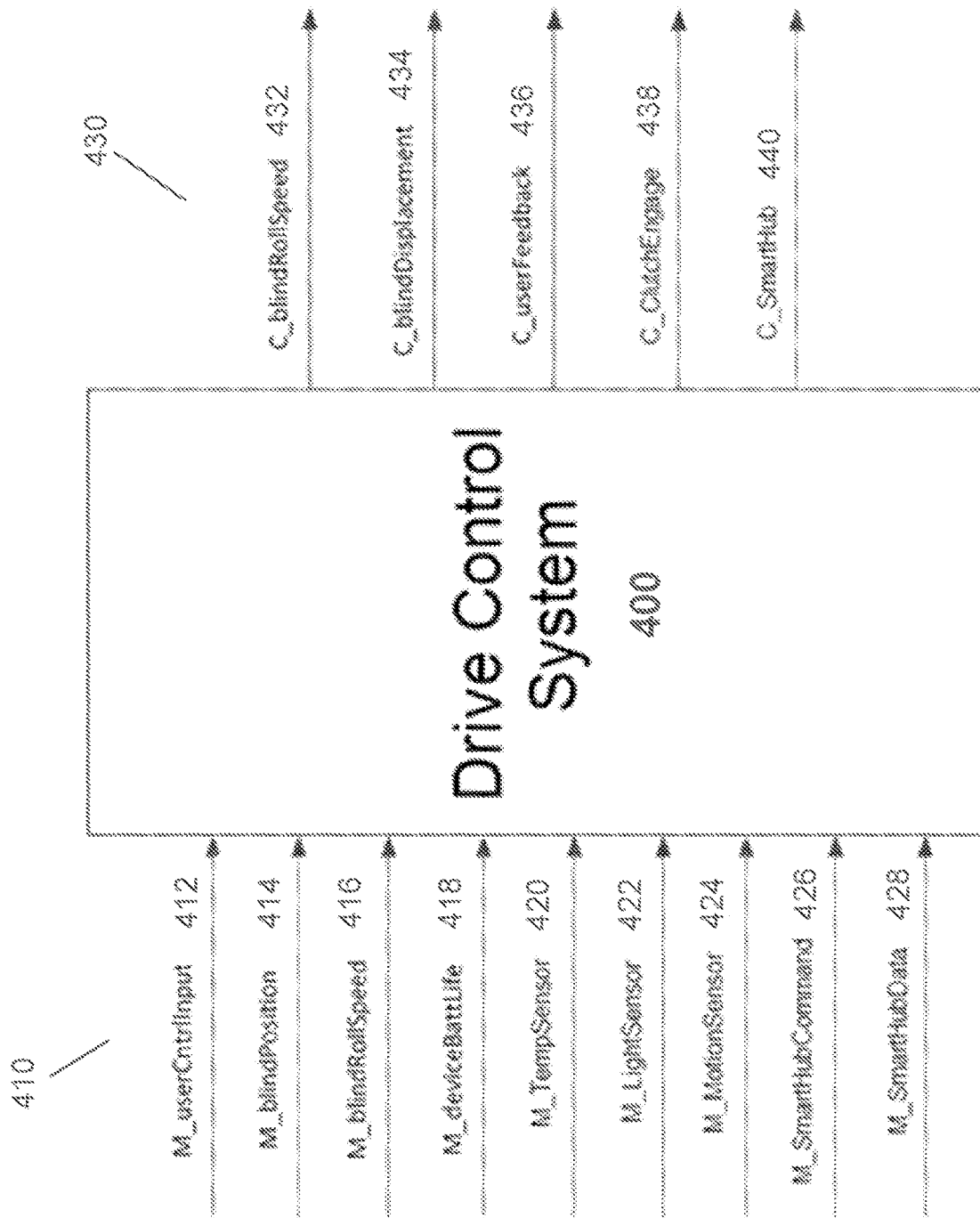
FIG. 8 is a schematic diagram of monitored and controlled variables of an external motor control system for a window covering system, according to an embodiment.

FIG. 8 is an input/output (black box) diagram of an external motor control system 400. Monitored variables (inputs) 410 of external motor control system 400 include: a user input command for blind control (e.g., string packet containing command) 412; distance of current position from top of blind (e.g., in meters) 414; rolling speed of the blind (e.g., in meters per second) 416; current charge level of battery (e.g., in mV) 418; temperature sensor output (e.g., in mV) 420; light sensor output (e.g., in mV) 422; motion sensor output (e.g., in mV) 424; smart-home hub command (e.g., string packet containing command) 426; smart-home data (e.g., thermostat temperature value in degrees Celsius) 428; and current draw of the motor 302 (e.g., in A) 430.

Controlled variables (outputs) 440 of external motor control system 400 include: intended rolling speed of the blind at a given time (e.g., in meters per second) 442; intended displacement from current position at a given time (e.g., in meters) 444; feedback command from the device for user (e.g., string packet containing command) 446; clutch engage/disengage command at a given time 448; and output data to smart-home hub (e.g., temperature value in degrees Celsius corresponding to temperature sensor output 420) 450.

In an embodiment, external motor control system 400 sends data (such as sensor outputs 432, 434, and 436) to a third party home automation control system or device. The third-party system or device can act upon this data to control other home automation functions. Third-party home automation devices include, for example, "smart thermostats" such as the Honeywell Smart Thermostat (Honeywell International Inc., Morristown, N.J.); Nest Learning Thermostat (Nest Labs, Palo Alto, Calif.); Venstar programmable thermostat (Venstar, Inc., Chatsworth, Calif.); and Lux programmable thermostat (Lux Products, Philadelphia, Pa.). Other home automation devices include HVAC (heating, ventilating, and air conditioning) systems, and smart ventilation systems.

In another embodiment, external motor control system 400 accepts commands, as well as data, from third-party systems and devices and acts upon these commands and data to control the windows covering system.

In an embodiment, the external motor control system 400 schedules operation of the windows covering system via user-programmed schedules.

In an embodiment, sensor outputs of motion sensor 424 are incorporated in a power saving process. Sensor 424 may be a presence/motion sensor in the form of a passive infrared (PIR) sensor, or may be a capacitive touch sensor, e.g., associated with a capacitive touch input interface of the external motor. In this process, the external motor system 400 hibernates/sleeps until the presence/motion sensor detects motion or the presence of a user. In an embodiment, upon sensing user presence/motion, an LED indicator of the external motor device lights up to indicate that the device can be used. In an embodiment, after a period of inactivity, the device enters a low power state to preserve energy.

In a further embodiment, external motor control system 400 controls multiple windows covering systems, and may group window covering systems to be controlled together as described above relative to Group Mode controls. Examples of groups include external motors associated with windows facing in a certain direction, and external motors associated with windows located on a given story of a building.

In another embodiment, external motor control system 400 controls the windows covering system based upon monitored sensor outputs. For example, based upon light sensor output 422, the window covering system may automatically open or close based upon specific lighting conditions such as opening blinds at sunrise. In another example, based upon motion sensor output 424, the system may automatically open blinds upon detecting a user entering a room. In a further example, based upon temperature sensor output 420, the system may automatically open blinds during daylight to warm a cold room. Additionally, the system may store temperature sensor data to send to other devices.

Figure 22:
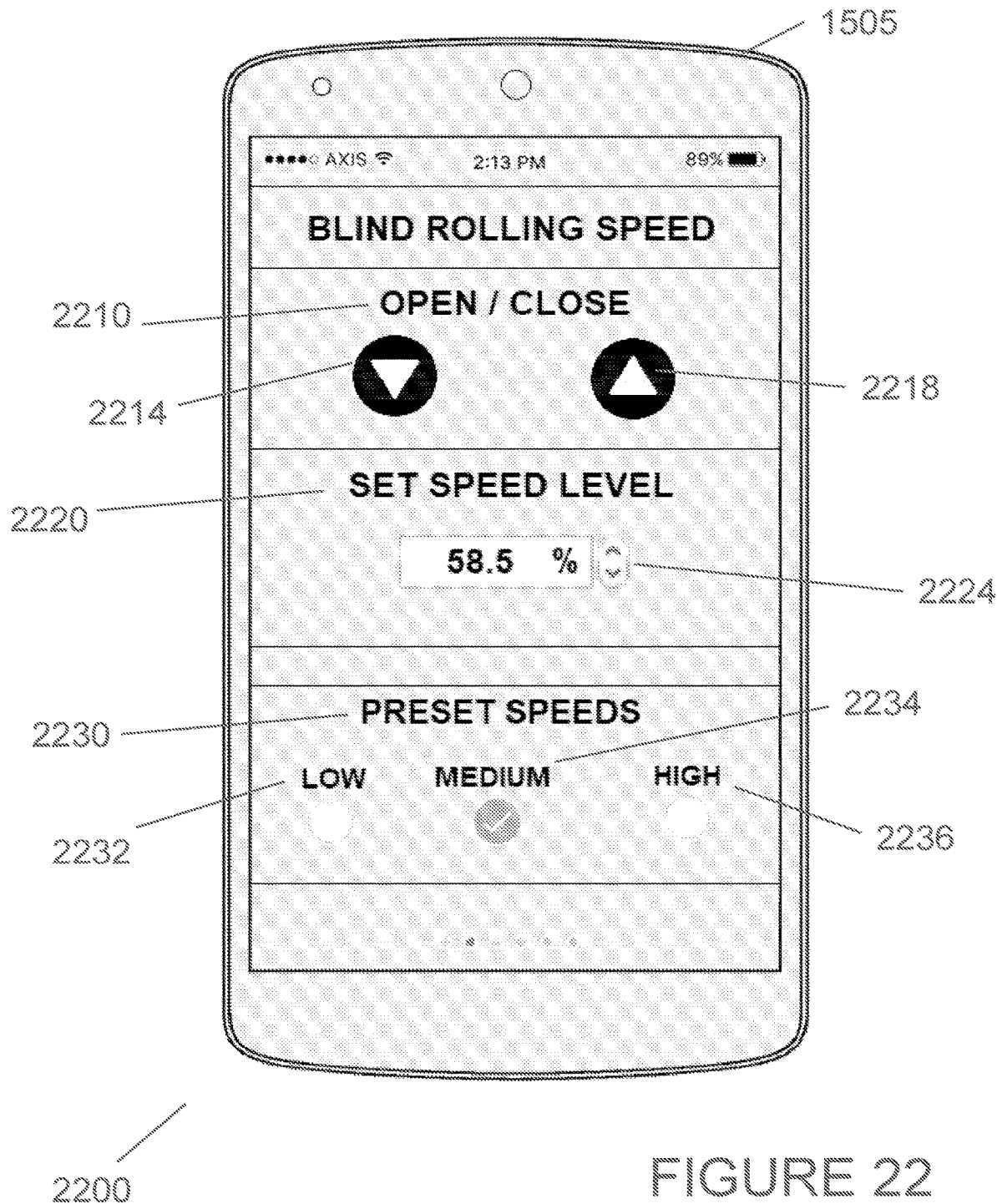
FIG. 22 is a front view of a graphical user interface displayed on an electronic device that presents a speed control screen of an external motor control application, according to an embodiment.

In an embodiment, a window covering application can control the direction and speed of advancing and retracting a window covering. Speed control screen 2200 of FIG. 22 is used to set the direction (open/close) and speed of movement of a window covering. In the illustrated embodiment, the user has selected a roller blind at the window covering device selection screen of FIG. 17, and speed control screen 2200 controls the vertical direction and rolling speed (e.g., in meters per second) of the roller blind. Open/Close control 2210 displays down-arrow 2214 and up-arrow 2218 icons that respectively cause the window blind controller to lower (open) and raise (close) the roller blind. Speed control screen includes two different modes 2220, 2230 for the user to select blind rolling speed, and normally only one of these modes is used at a time. Set Speed Level mode 2200 includes a control 2224 that selects a percent value between 0% (roller blind stationary, or idle state) and 100% (maximum speed), inclusive. In various embodiments, percentage control 2224 may select a percent value within a continuous range, or may select a percent value from a range of discrete values For example, as shown percentage control selects a percent value with one decimal place, i.e., 58.5% of maximum speed. Preset Speeds mode 2230 includes several radio buttons, of which one can be chosen to select one of a limited number of predetermined roller blind rolling speeds. Here, the predetermined speeds include a low 2232, Medium 2234, and High 2236 speeds. In an embodiment, the maximum speed in mode 2220 and the preset speeds in mode 2230 are default speeds. In an embodiment, the maximum speed in mode 2220 and the preset speeds in mode 2230 are set by the user during device set-up.

Figure 19:
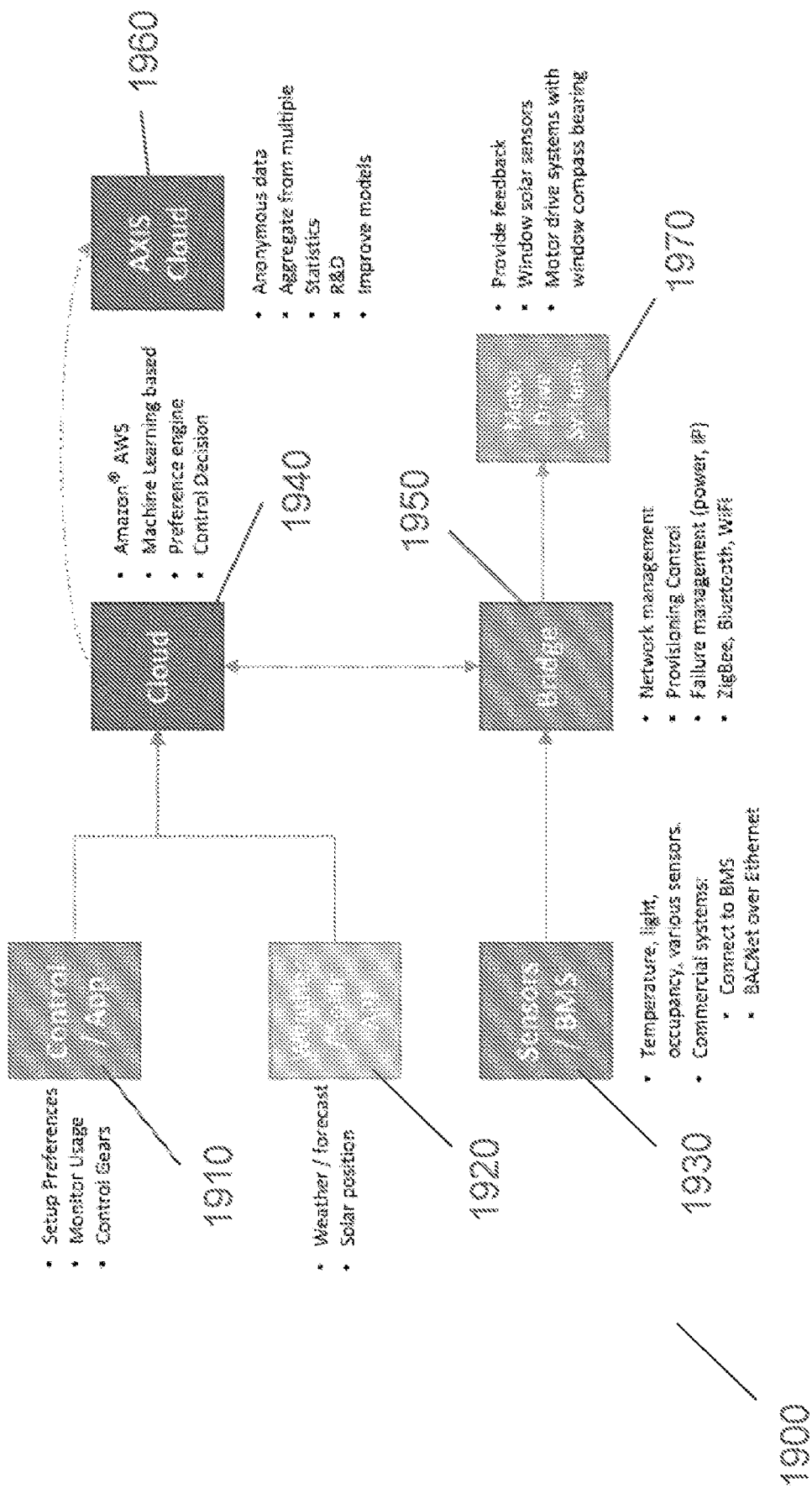
FIG. 19 is a block diagram of a solar heat gain management system, according to an embodiment.

FIG. 19 is a diagram of a subsystem (also called system) 1900 that coordinates with the external motor window covering drive system, external data sources, and sensors to manage solar heating effects. Subsystem 1900 automates positional control of the window covering based on weather conditions (e.g., public weather data), time-of-day, location of the window coverings, and other conditions that can affect solar heat gain.

Windows provide occupants with daylight, direct sunlight, visual contact with the outside and a feeling of openness. Since solar energy is comprised of light and heat this energy is not easy to control and for this reason, lighting and heat effects have to be considered at the same time. While it is desirable to introduce sunlight for natural lighting over a given constant level, the radiation heat of the sun has to be determined whether or not to allow passage of sunlight into the building interior according to various conditions. In the present disclosure, conditions for determining whether or not to allow passage of sunlight into the building interior are referred to as sunlight entrance conditions, also called sunlight entrance condition data. In various embodiments, sunlight entrance conditions can be detected, calculated, or stored by various elements of the system 1900 for managing solar heating effects.

A principal factor for determining whether or not to allow passage of sunlight is external weather conditions. Seasonality also can involve significant sunlight entrance conditions. The radiation heat from the sun reduces the heating load in the winter season but increases the cooling load during the summer season. During times of peak solar gain, it can be desirable to cover windows (e.g., lower roller blinds) in order to reduce cooling loads and overheating. Under cloudy conditions, or in winter, it can be desirable to uncover windows (e.g., raise roller blinds) to allow daylight and useful solar gains to enter the building, so that the building can reduce its dependence on electric lighting and heating.

Locations of windows that includes solar orientation can represent significant sunlight entrance conditions. As a rule, north-facing rooms have good daylight most of the day; have solar gain for most of the day throughout the year; may require window covering to prevent overheating in summer; and have good passive solar gain in winter. As a rule, east-facing rooms have good morning light; have solar gain in the morning throughout the year to provide initial warming; and will be cooler in the late afternoon. As a rule, west-facing rooms have limited morning light; have good afternoon daylight; for much of the year may require window covering to prevent excessive heating and glare in the late afternoon; and provide good direct solar gain for thermal mass heating of living spaces in the evening. As a rule, south facing rooms have lower levels of daylight during parts of the year, and have little or no heat gain.

Location of windows including solar orientation, in combination with time-of-day, often represent a significant combination of sunlight entrance conditions. For example, it may be desirable to cover windows located on the eastern front on a building during the morning as the sun rises, in order to block out solar heat gain and reduce the need for artificial cooling in the building. It may be desirable during daylight hours to uncover windows located on the western front of the building, in order to capture natural daylight and reduce the need for artificial lighting.

Sunlight entrance conditions also can include interior illuminance, and room temperature, as measured for example by light and temperature sensors in the vicinity of the device for opening and closing the window covering. Another consideration is whether the building or a room of the building is occupied, as measured for example by occupancy sensors.

As used in the present disclosure, one or more window uncover criteria are a set of sunlight entrance conditions received by the drive system controller that cause the drive system to retract or open a window covering. In various embodiments, window uncover criteria may cause the drive system to fully retract or uncover the window covering, or to partially retract or open the window covering (e.g., to a given decreased level of openness). As used in the present disclosure, one or more window cover criteria are a set of sunlight entrance conditions received by the drive system controller that cause the drive system to spread or close a window covering. In various embodiments, window cover criteria may cause the drive system to fully spread or cover the window covering, or to partially spread or close the window covering (e.g., to a given increased level of openness).

In an embodiment, window uncover criteria and window cover criteria are scores calculated by the drive system controller based on the set of sunlight entrance conditions received. In another embodiment window uncover criteria and window cover criteria are maximum and minimum thresholds based on sunlight entrance conditions. Processes for determining window uncover criteria and window cover criteria can include weighting of sunlight entrance conditions, and combinations of related sunlight entrance conditions such as combinations of window location (solar orientation) with time-of-day.

In the block diagram of FIG. 19, Control/App module 1910 may represent various types of control devices. Control/App module 1910 may be designed for use with a commercial building window covering control system. In other embodiments, a simplified control system may be designed for use with a home window covering control system. In various embodiments, the control device 1910 may be implemented in a mobile device application, or desktop application. In a preferred network arrangement, the system is controlled over IP (internet protocol) to the "cloud." Control system 1910 provides user and management level control, monitoring, setup, and override system operation.

In various embodiments, cloud 1940 is a back-end system that handles overall system intelligence, controls algorithms, and the decision engine. The system handles inputs from various sensors, and includes deployment-specific and usage preferences. A weather systems API makes decisions on which window shades should be fully open, fully closed, or at a given intermediate level of openness. In various embodiments, cloud 1940 incorporates machine learning algorithms. In an embodiment, cloud 1940 is implemented in AMAZON® AWS® web services (AWS is a registered trademark of Amazon Technologies, Inc., Seattle, Wash. for Application Service Provider services).

AXIS Cloud 1960 is a back-end system that collects anonymous usage data and statistics used to improve algorithmic models. In various embodiments, this data is used in ongoing training and improvement of the system 1900.

Weather/solar API 1920 extracts weather data and solar data from resources such as openweathermap.org and geotoolkit.org. Openweathermap.org is an online service that provides weather data, including current weather data, forecasts, and historical data to developers of web services and mobile applications. The openweathermap service is based on the VANE Geospatial Data Science platform. Geotoolkit.org is a free, Java language library for developing geospatial applications.

Sensors/BMS module 1930 includes sensors of the external motor window covering control system such as light, temperature, and occupancy sensors. In some embodiments, sensors/BMS module is integrated with building management systems such as BACnet, which can interface with Bridge 1950 over Ethernet. BACnet is a communications protocol for Building Automation and Control (BAC) networks that leverage ASHRAE, ANSI, and ISO 16484-5 standard protocols. In various embodiments, sensors/BMS 1930 communicate with other system elements via communication protocols such as ZigBee, Bluetooth, and WiFi. Outputs of the sensors/BMS module are used to control decision algorithms for solar heat gain, and in related control functions such as integrated control of ambient temperatures.

Bridge 1950 is a central conduit for wireless connectivity to the external motor window covering drive systems, and to sensors, BACnet, and IP connectivity to the Cloud 1940 and to Control/App module 1910. In an exemplary commercial implementation, a Bridge device 1950 is placed on each floor of an office building according to coverage and range. In certain embodiments, Bridge 1950 runs certain control and failure mode algorithms upon detecting loss of connectivity to Cloud 1940.

External motor drive systems 1970 are installed at window covering systems and provide shade position data and solar data at specific window locations. In some embodiments, external motor drive systems 1700 are controlled directly by control system 1900.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A drive system for use with a window covering system including a headrail, a mechanism associated with the headrail for spreading and retracting a window covering, and a continuous cord loop extending below the headrail for actuating the mechanism for spreading and retracting the window covering, the drive system comprising:
   a motor configured to rotate an output shaft of the motor;
   a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; and
   a controller for providing positional commands to the motor and the drive assembly to control the advancing the continuous cord loop in the first direction and the advancing the continuous cord loop in the second direction,
   wherein the drive system is configured to receive user input from a mobile user device to cause the controller to provide the positional commands to the motor and the drive assembly, wherein the positional commands to the motor are based on a one-axis quantitative scheme associated with the user input along an input axis of a touch interface of the mobile user device.

2. The drive system of claim 1, wherein the positional commands based on the one-axis quantitative scheme comprise a command to raise or lower the window covering to a given position of the window covering in response to a user input at a given position of the touch interface along the input axis.

3. The drive system of claim 2, wherein the positional commands based on the one-axis quantitative scheme comprise a command to raise or lower the window covering to a given absolute position of the window covering in response to the user gesture at the given position of the touch interface along the input axis.

4. The drive system of claim 2, wherein the positional commands based on the one-axis quantitative scheme comprise a command to raise or lower the window covering to a given relative position of the window covering in response to the user gesture at the given position of the touch interface along the input axis, wherein the given relative position of the window covering corresponds to a calibrated distance between a set top position and a set bottom position.

5. The drive system of claim 1, wherein the positional commands based on the one-axis quantitative scheme comprise a command to raise or lower the window covering to one of a plurality of openness levels between the top and bottom of the display via one of pre-set inputs along the input axis of the touch interface.

6. The drive system of claim 1, wherein the user input along the input axis of the touch interface comprises user gestures selected from the group typing-style gestures including touching, pressing, pushing, tapping, double tapping, and two-finger tapping; gestures for tracing a pattern including swiping, waving, and hand motion control; and multi-touch gestures.

7. The drive system of claim 1, wherein a window covering position control application of the mobile user device is configured to generate for display a visual display aligned with the input axis of the touch interface.

8. The drive system of claim 1, further comprising wireless communication between the controller and the mobile user device to cause the controller to provide the positional commands to the motor and the drive assembly in response to the user input along the input axis of the touch interface.

9. A drive system for use with a window covering system including a headrail, a mechanism associated with the headrail for spreading and retracting a window covering, and a continuous cord loop extending below the headrail for actuating the mechanism for spreading and retracting the window covering, the drive system comprising:
   a motor configured to rotate an output shaft of the motor;
   a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; and
   a controller for providing positional commands to the motor and the drive assembly to control the advancing the continuous cord loop in the first direction and the advancing the continuous cord loop in the second direction,
   wherein the drive system is configured receive user input from an input-output device to cause the controller to provide the positional commands to the motor and the drive assembly, wherein the positional commands to the motor are based on a one-axis quantitative scheme associated with the user input along an input axis of a touch interface of the input-output device.

10. The drive system of claim 9, wherein the positional commands based on the one-axis quantitative scheme comprise a command to raise or lower the window covering to a given position of the window covering in response to a user input at a given position of the touch interface along the input axis.

11. The drive system of claim 10, wherein the positional commands based on the one-axis quantitative scheme comprise a command to raise or lower the window covering to a given absolute position of the window covering in response to the user gesture at the given position of the touch interface along the input axis.

12. The drive system of claim 10, wherein the positional commands based on the one-axis quantitative scheme comprise a command to raise or lower the window covering to a given relative position of the window covering in response to the user gesture at the given position of the touch interface along the input axis, wherein the given relative position of the window covering corresponds to a calibrated distance between a set top position and a set bottom position.

13. The drive system of claim 9, wherein the positional commands based on the one-axis quantitative scheme comprise a command to raise or lower the window covering to one of a plurality of openness levels between the top and bottom of the display via one of pre-set inputs along the input axis of the touch interface.

14. The drive system of claim 9, wherein the user input along the input axis comprise user gestures selected from the group typing-style gestures including touching, pressing, pushing, tapping, double tapping, and two-finger tapping; gestures for tracing a pattern including swiping, waving, and hand motion control; and multi-touch gestures.

15. The drive system of claim 9, wherein the input-output device comprises a mobile user device, wherein a window covering position control application of the mobile user device is configured to generate for display a visual display aligned with the input axis of the touch interface.

16. The drive system of claim 15, further comprising wireless communication between the controller and the mobile user device to cause the controller to provide the positional commands to the motor and the drive assembly in response to the user input along the input axis of the touch interface.

17. The drive system of claim 9, wherein the drive assembly and the controller operate in one of a vertical mode and a horizontal mode, wherein in the vertical mode the drive assembly is configured for advancing the continuous cord loop in the first direction to lower the window covering and is configured for advancing the continuous cord loop in the second direction to raise the window covering, and the visual display and the input axis of the touch interface are aligned vertically, and wherein in the horizontal mode the drive assembly is configured for advancing the continuous cord loop in the first direction to laterally close the window covering and is configured for advancing the continuous cord loop in the second direction to laterally open the window covering, and the visual display and the input axis of the touch interface are aligned horizontally.

18. The drive system of claim 17, wherein the input-output device includes a settings interface that is configured to select a mechanism for spreading and retracting the window covering from one of roller shades, Roman shades, vertical blinds and curtains.

19. The drive system of claim 18, wherein in the event the settings interface selects a mechanism for spreading and retracting the window covering from one of roller shades and Roman shades, the drive assembly and the controller operate in the horizontal mode; and wherein in the event the settings interface selects a mechanism for spreading and retracting the window covering from one of vertical blinds and curtains, the drive assembly and the controller operate in the vertical mode.

20. The drive system of claim 17, wherein in the vertical mode the touch interface comprises a vertically aligned touch strip, and in the horizontal mode the touch interface comprises a horizontally aligned touch strip.

* * * * *